(12) United States Patent
Tsukamoto et al.

(10) Patent No.: US 11,870,040 B2
(45) Date of Patent: Jan. 9, 2024

(54) ELECTRODE PLATE AND SECONDARY BATTERY

(71) Applicant: PRIME PLANET ENERGY & SOLUTIONS, INC., Tokyo (JP)

(72) Inventors: Kentaro Tsukamoto, Kobe (JP); Yoshifumi Magari, Hirakata (JP)

(73) Assignee: Prime Planet Energy & Solutions, Inc., Tokyo (JP)

(*) Notice: Subject to any disclaimer, the term of this patent is extended or adjusted under 35 U.S.C. 154(b) by 39 days.

(21) Appl. No.: 17/576,357

(22) Filed: Jan. 14, 2022

(65) Prior Publication Data

US 2022/0246990 A1 Aug. 4, 2022

(30) Foreign Application Priority Data

Jan. 29, 2021 (JP) .................. 2021-13405

(51) Int. Cl.
*H01M 10/0585* (2010.01)
*H01M 50/533* (2021.01)
(Continued)

(52) U.S. Cl.
CPC ......... *H01M 10/0585* (2013.01); *H01M 4/48* (2013.01); *H01M 4/661* (2013.01);
(Continued)

(58) Field of Classification Search
CPC .... H01M 10/0585; H01M 4/48; H01M 4/661; H01M 10/0587; H01M 50/103;
(Continued)

(56) References Cited

U.S. PATENT DOCUMENTS

2010/0028767 A1 2/2010 Inose et al.
2011/0159370 A1* 6/2011 Inaba .................... H01M 4/134
429/231.1

(Continued)

FOREIGN PATENT DOCUMENTS

CN 102132443 A 7/2011
CN 102623740 A 8/2012
(Continued)

OTHER PUBLICATIONS

Janicki et al. Copper Oxides on a Cu Sheet Substrate Made by Laser Technique, Aug. 27, 2020, retrieved from https://www.ncbi.nlm.nih.gov/pmc/articles/PMC7503507/. (Year: 2020).*

*Primary Examiner* — Matthew T Martin
*Assistant Examiner* — Bartholomew A Hornsby
(74) *Attorney, Agent, or Firm* — Finnegan, Henderson, Farabow, Garrett & Dunner, LLP

(57) ABSTRACT

According to the present disclosure, a technique capable of suppressing an internal short circuit caused by a peeled metal piece and obtaining a safer secondary battery is provided. An electrode plate (negative electrode plate) disclosed herein includes a negative electrode core including copper or a copper alloy, a negative electrode active material layer applied to a surface of the negative electrode core, and a negative electrode tab protruding to the outside from one end side in a width direction. In the negative electrode plate, a first region having an oxide film having a thickness of 40 nm to 200 nm is formed in a region of 0.01 mm to 0.2 mm from an outer end side of the negative electrode tab toward the inside in the width direction, and the first region 22*t*1 extends along the outer end side 22*ta* of the negative electrode tab 22*t*. As a result, a metal piece that can be peeled off from the negative electrode tab 22*t* can be insulated and inactivated in advance, so that an internal short circuit due to the peeled metal piece can be suppressed.

11 Claims, 11 Drawing Sheets

(51) Int. Cl.
  *H01M 50/54* (2021.01)
  *H01M 50/103* (2021.01)
  *H01M 4/48* (2010.01)
  *H01M 4/66* (2006.01)
  *H01M 10/0587* (2010.01)

(52) U.S. Cl.
  CPC ..... *H01M 10/0587* (2013.01); *H01M 50/103* (2021.01); *H01M 50/533* (2021.01); *H01M 50/54* (2021.01)

(58) Field of Classification Search
  CPC .... H01M 50/533; H01M 50/54; H01M 4/667; H01M 50/534
  See application file for complete search history.

(56) References Cited

U.S. PATENT DOCUMENTS

| | | | |
|---|---|---|---|
| 2012/0196172 A1 | 8/2012 | Maeda et al. | |
| 2016/0036009 A1* | 2/2016 | Cho | B23K 26/244 219/121.72 |
| 2016/0111728 A1* | 4/2016 | Ohta | H01M 10/0525 429/246 |

FOREIGN PATENT DOCUMENTS

| | | |
|---|---|---|
| CN | 105322213 A | 2/2016 |
| CN | 105359303 A | 2/2016 |
| DE | 10 2017 216 565 A1 | 3/2019 |
| JP | 2010-034009 A | 2/2010 |
| JP | 2016-033912 A | 3/2016 |

\* cited by examiner

ELECTRODE PLATE AND SECONDARY BATTERY

CROSS REFERENCE TO RELATED APPLICATIONS

This application claims priority based on Japanese Patent Application No. 2021-13405 filed on Jan. 29, 2021, and the entire contents of the application are incorporated herein by reference.

BACKGROUND

1. Technical Field

The present disclosure relates to an electrode plate and a secondary battery.

2. Description of the Related Art

A secondary battery such as a lithium ion secondary battery is provided with a pair of electrode plates. These electrode plates usually include an electrode core which is a foil-shaped metal member, and an electrode active material layer applied to the surface of the electrode core. In the present description, the electrode plate on the positive electrode side is referred to as a "positive electrode plate", and the electrode plate on the negative electrode side is referred to as a "negative electrode plate". Further, the electrode core on the positive electrode side is referred to as a "positive electrode core", and the electrode core on the negative electrode side is referred to as a "negative electrode core". Furthermore, the electrode active material layer on the positive electrode side is referred to as a "positive electrode active material layer", and the electrode active material layer on the negative electrode side is referred to as a "negative electrode active material layer".

The electrode plate of the secondary battery having the above configuration is produced by, for example, applying an electrode active material layer to the surface of a large electrode core to prepare an electrode precursor, and then cutting the electrode precursor to a desired size. For example, JP2010-34009 discloses a method for manufacturing a laminated secondary battery including the steps of applying an electrode active material to a metal foil larger than the electrode area to form an electrode active material layer, and then cutting the metal foil by laser radiation. JP2016-33912 discloses a method for manufacturing a secondary battery including the steps of preparing an electrode plate including a coated portion in which a current collector is coated with an electrically active material and a non-coated portion in which the electrically active material is not coated, and cutting the non-coated portion with a continuous wave laser beam.

SUMMARY

However, where laser cutting is performed when cutting out the electrode plate from the electrode precursor, a metal piece may easily peel off from the electrode core of the cut electrode plate. Where this peeled metal piece is mixed between the positive electrode plate and the negative electrode plate as a conductive foreign matter, the metal piece may cause an internal short circuit. Further, an internal short circuit may also occur due to reprecipitation of the metal piece after the metal piece has been dissolved in the electrolytic solution. The present disclosure has been made in view of such a problem, and an object of the present disclosure is to provide a technique making it possible to suppress an internal short circuit caused by the peeled metal piece and to obtain a safer secondary battery.

In order to achieve the above object, the technique disclosed herein provides an electrode plate having the following configuration.

The electrode plate disclosed herein is to be used for a secondary battery. Such an electrode plate includes an electrode core including a conductive metal material, an electrode active material layer that is applied to the surface of the electrode core and includes an electrode active material, and an electrode tab which protrudes to the outside from one end side in the width direction and in which the electrode active material layer is not applied and the electrode core is exposed. In such an electrode plate, a first region having an oxide film of the metal material with a thickness of 40 nm to 200 nm is formed in a region of at least 0.01 mm to 0.2 mm from an outer end side of the electrode tab toward the inside in a width direction, and the first region extends along the outer end side of the electrode tab.

The present inventors have conducted various studies in order to achieve the above object and focused attention on the fact that when an electrode core is cut by laser cutting, the surface of a metal piece peeled off from the electrode core may be coated with an oxide film. Since the metal piece coated with the oxide film is insulated, no internal short circuit occurs even when the metal piece is mixed between the positive electrode plate and the negative electrode plate. Further, since the metal piece coated with the oxide film is inactivated, dissolution thereof in an electrolytic solution can also be suppressed. The electrode plate disclosed herein is based on such findings. Specifically, in the electrode plate disclosed herein, a first region having an oxide film with a thickness of 40 nm or more is formed in a region of 0.01 mm or more from the outer end side of the electrode tab toward the inside in the width direction, and the first region extends along the outer end side of the electrode tab. By intentionally forming an oxide film having certain or larger thickness and area in this way, a metal piece that can be peeled off from the electrode tab can be insulated and inactivated in advance. Therefore, it is possible to obtain a secondary battery of higher safety in which the internal short circuit caused by the peeled metal piece is suppressed.

Where the length of the first region (hereinafter, also referred to as "width of the first region") from the outer end side of the electrode tab toward the inside in the width direction exceeds 0.2 mm, the area occupied by the oxide film on the surface of the electrode tab becomes too large, and electrical resistance when another conductive member (such as a current collecting member) is connected to the electrode tab may increase significantly. Therefore, in the electrode plate disclosed herein, the width of the first region is limited to 0.2 mm or less. Further, where the thickness of the oxide film exceeds 200 nm, only the oxide film may be peeled off first. Therefore, in the technique disclosed herein, the thickness of the oxide film in the first region is set to 200 nm or less.

Further, in one embodiment of the electrode plate disclosed herein, a second region in which the thickness of the oxide film of the metal material gradually decreases toward the inside in the width direction is formed so as to be adjacent to the inside of the first region in the width direction. As a result, the oxide film is more fixedly attached to the non-oxidized region of the electrode tab, and the oxide film can be more suitably prevented from peeling off first.

Further, in one embodiment of the electrode plate disclosed herein, the electrode core includes copper or a copper alloy as the metal material. The technique disclosed herein can exert a more advantageous effect when an electrode core including copper or a copper alloy is used.

Further, the electrode plate disclosed herein is particularly preferably used for an electrode plate (negative electrode plate) on a negative electrode side.

Further, in one embodiment of the electrode plate disclosed herein, a plurality of electrode tabs is formed on one end side in the width direction of the electrode plate at a predetermined interval in a longitudinal direction of the electrode plate, and the electrode active material layer is adjacent to the end side located between the electrode tabs. By placing the electrode active material layer adjacent to the end side located between the electrode tabs and preventing the electrode core from being exposed, it is possible to prevent a metal piece from peeling off from the portion other than the electrode tabs.

Further, in the embodiment in which the electrode active material layer is adjacent to the end side between the plurality of electrode tabs, it is preferable that a thick portion having a thickness larger than that of the electrode core in the central region in the width direction be provided at an end of the electrode core on an end side adjacent to the electrode active material layer. As a result, it is possible to prevent a part of the electrode active material layer from falling off or peeling off from the negative electrode core.

Further, in the embodiment in which the thick portion is formed at the end of the electrode core, it is preferable that a coating layer including a carbon material or a compound including a carbon element be adhered to the surface of the thick portion. Since such a coating layer has excellent adhesion to the electrode core (thick wall portion), the electrode active material layer can be more suitably prevented from peeling off or falling off from the electrode core.

Further, in the embodiment in which the thick portion is formed at the end of the electrode core, the ratio of the thickness of the coating layer of the thick portion to the thickness of the electrode active material layer is preferably 0.01 to 0.2. As a result, damage to the separator due to contact of the thick portion with the separator can be suitably prevented, and the electrode active material layer can be more suitably prevented from peeling off or falling off from the electrode core.

Further, in the embodiment in which the thick portion is formed at the end of the electrode core, it is preferable that the thick portion of the electrode core have a claw shape including a cap portion protruding on both sides or one side in the thickness direction, and a recess formed between the cap portion and the negative electrode core. Since the claw-shaped thick portion exerts an excellent anchoring effect and firmly holds the electrode active material layer and the coating layer, these layers can be suitably prevented from falling off and peeling off.

Further, in another embodiment of the electrode plate disclosed herein, a plurality of electrode tabs is formed on one end side in the width direction of the electrode plate at a predetermined interval in the longitudinal direction of the electrode plate, an exposed core region where the electrode core is exposed is adjacent to an end side located between the plurality of electrode tabs, the first region is formed on the outer end side of the exposed core region, and the first region extends along the longitudinal direction of the exposed core region. Where the electrode core is exposed at the end side located between the electrode tabs as in this embodiment, it is preferable that the first region including the oxide film of the metal material be formed in the exposed core region. As a result, a metal piece peeled off from the exposed core region can be adequately insulated and inactivated to suppress an internal short circuit.

A secondary battery is provided as another aspect of the technique disclosed herein. Such a secondary battery includes an electrode body including a positive electrode plate, a negative electrode plate, and a separator, and at least one of the positive electrode plate and the negative electrode plate is any of the above-mentioned electrode plates. As described above, by using the electrode plate disclosed herein, it is possible to suppress an internal short circuit of the secondary battery and improve safety.

DETAILED DESCRIPTION

Hereinafter, embodiments of the technique disclosed herein will be described with reference to the drawings. It should be noted that matters other than those specifically mentioned in the present description, which are necessary for implementing the technique disclosed herein (for example, general configuration and manufacturing process of a battery) can be ascertained as design matters for a person skilled in the art on the basis of the related art in the pertinent field. The technique disclosed herein can be implemented based on the contents disclosed in the present description and the common technical knowledge in the art.

In the present description, the notation of "A to B" indicating the range is inclusive of the meanings of "A or more and B or less", as well as "preferably larger than A" and "preferably smaller than B".

In the present description, the "secondary battery" refers to a general storage device in which a charge/discharge reaction is induced by the movement of charge carriers between a pair of electrodes (positive electrode and negative electrode) via an electrolyte. Such a secondary battery is inclusive of not only a so-called storage battery such as a lithium ion secondary battery, a nickel hydrogen battery, a nickel cadmium battery, and the like but also a capacitor such as an electric double layer capacitor. Hereinafter, among the above-mentioned secondary batteries, an embodiment targeting a lithium ion secondary battery will be described.

Secondary Battery

Figure 1:
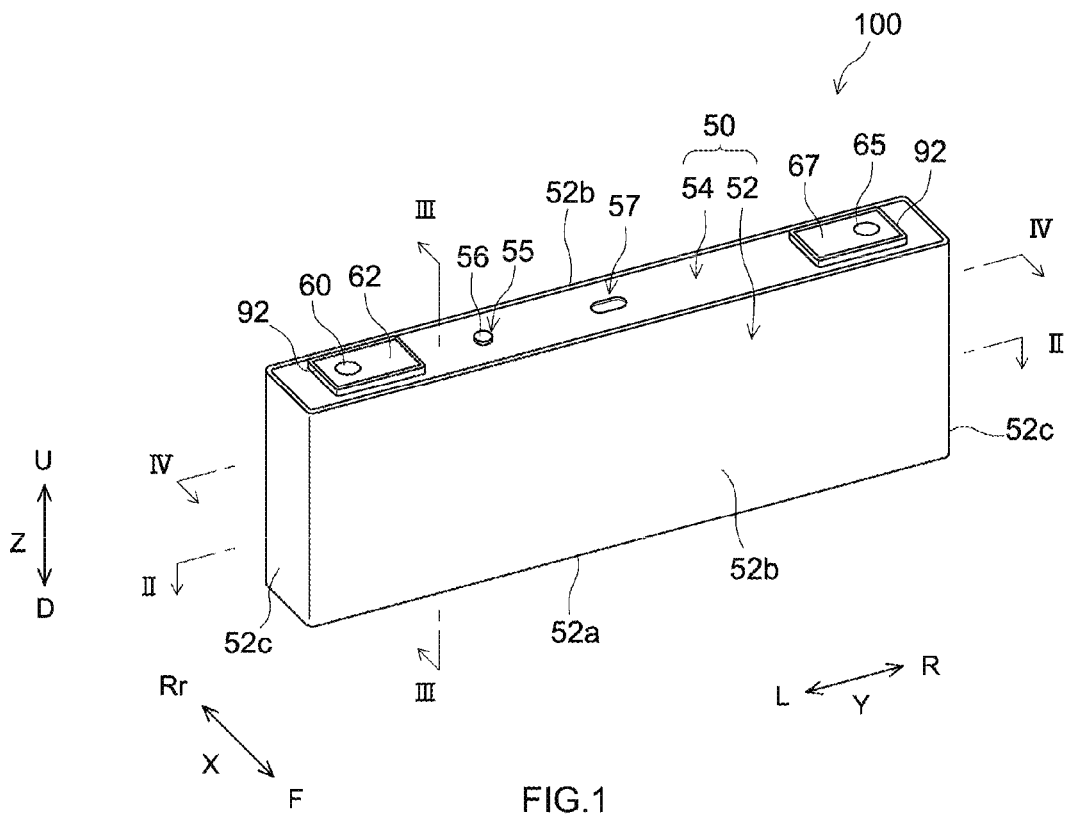
FIG. 1 is a perspective view schematically showing a secondary battery according to an embodiment.
Figure 2:
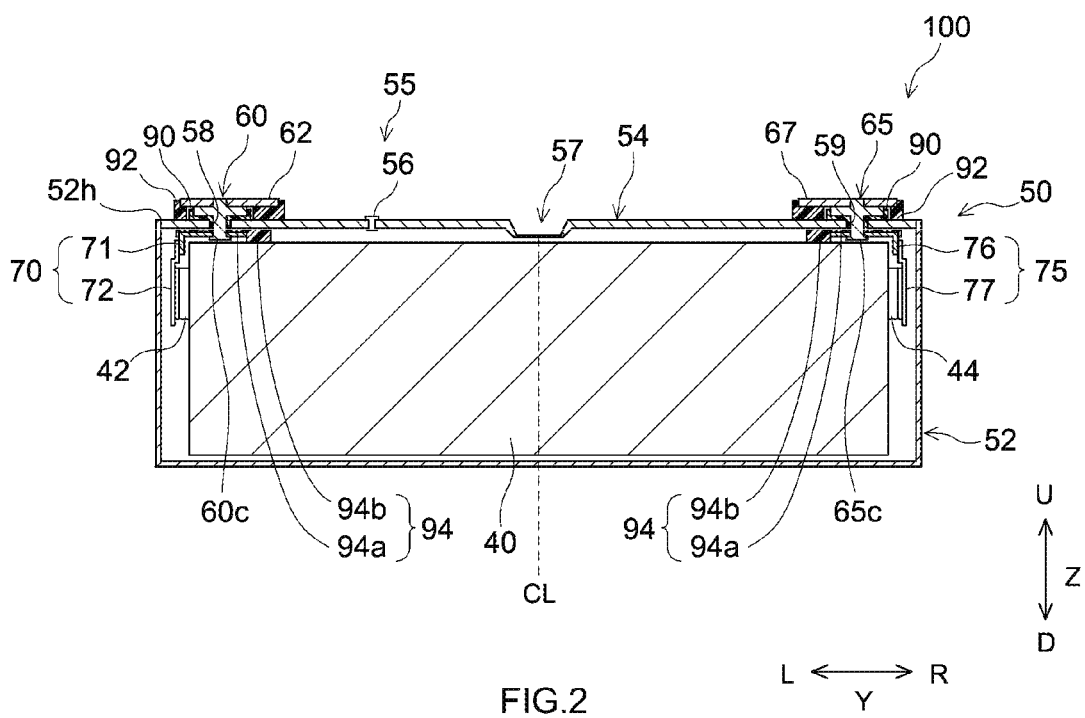
FIG. 2 is a schematic vertical cross-sectional view taken along the line II-II in FIG. 1.
Figure 3:
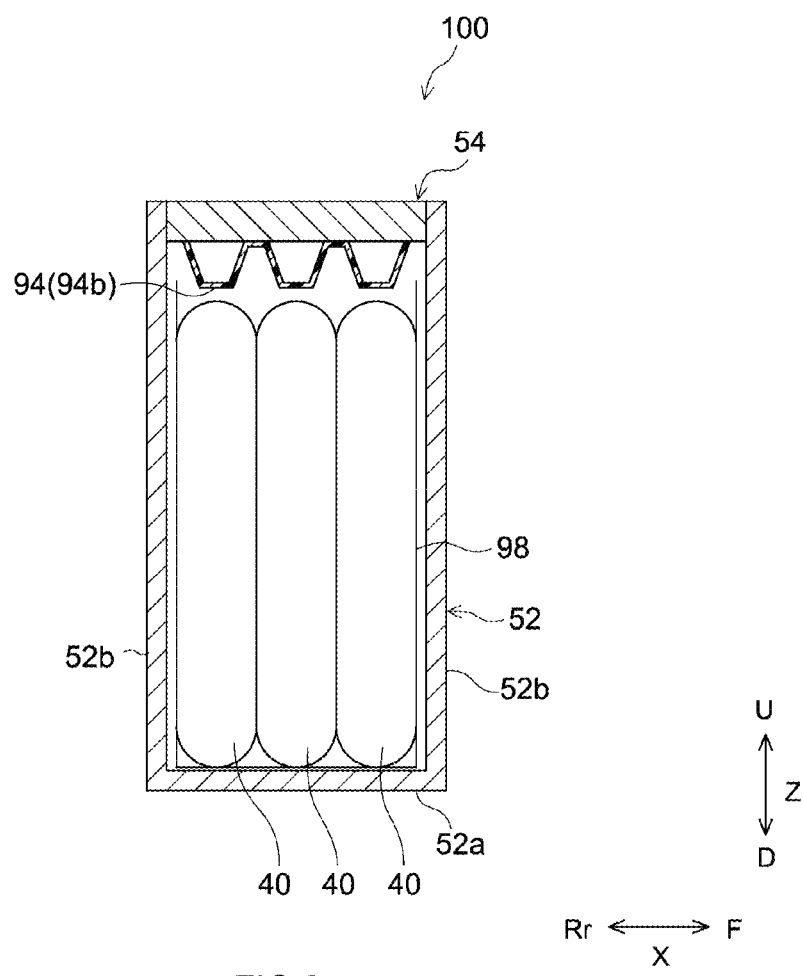
FIG. 3 is a schematic vertical cross-sectional view taken along the line III-III in FIG. 1.
Figure 4:
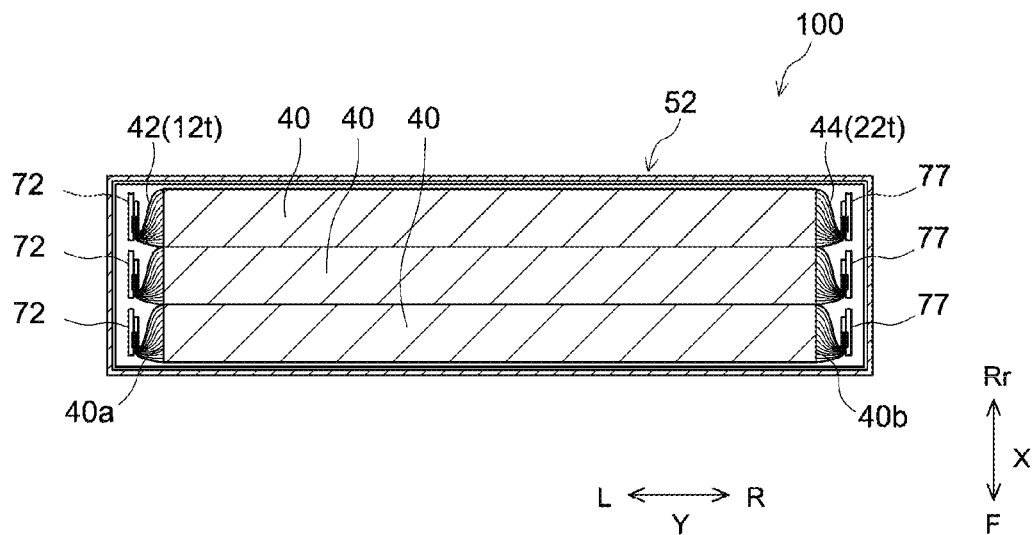
FIG. 4 is a schematic cross-sectional view taken along the line IV-IV in FIG. 1.
Figure 5:
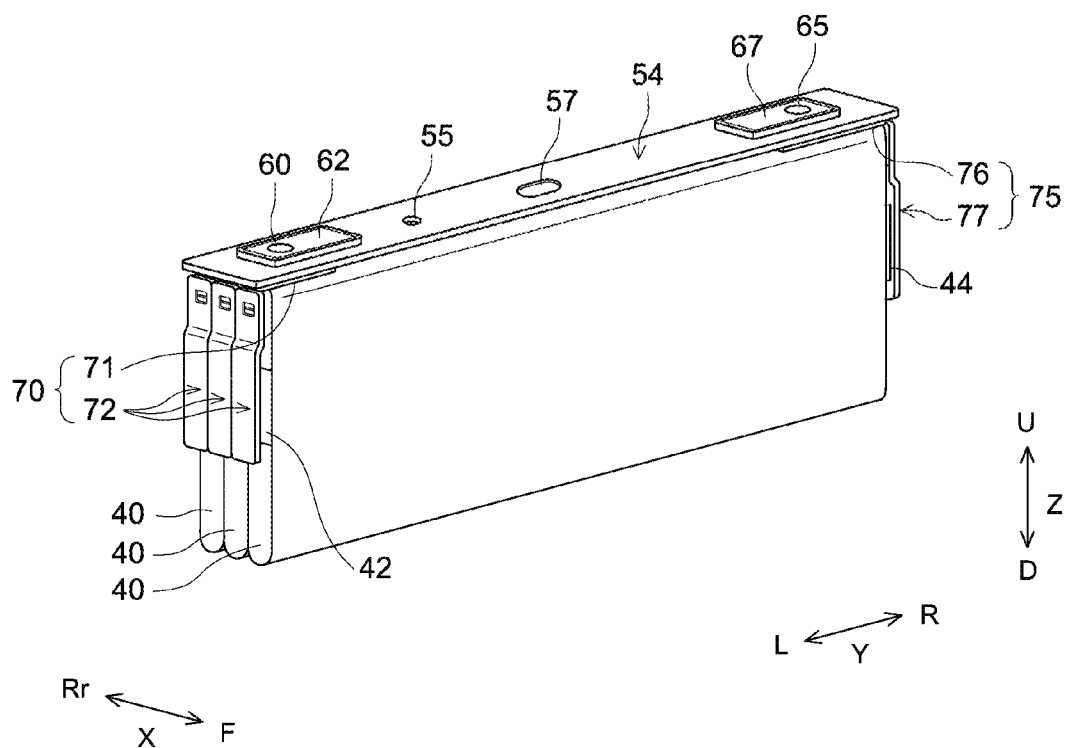
FIG. 5 is a perspective view schematically showing an electrode body attached to a sealing plate.
Figure 6:
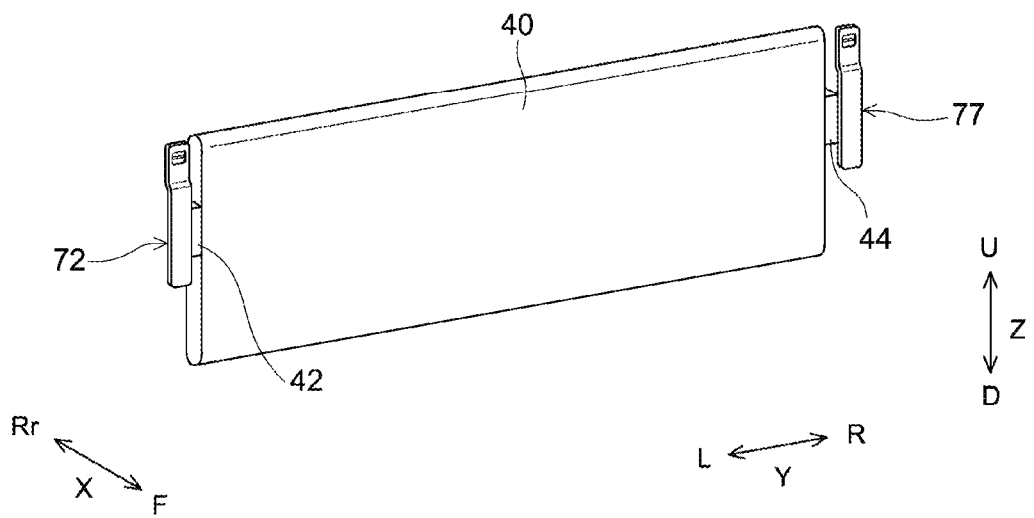
FIG. 6 is a perspective view schematically showing an electrode body to which a positive electrode second current collector and a negative electrode second current collector are attached.
Figure 7:
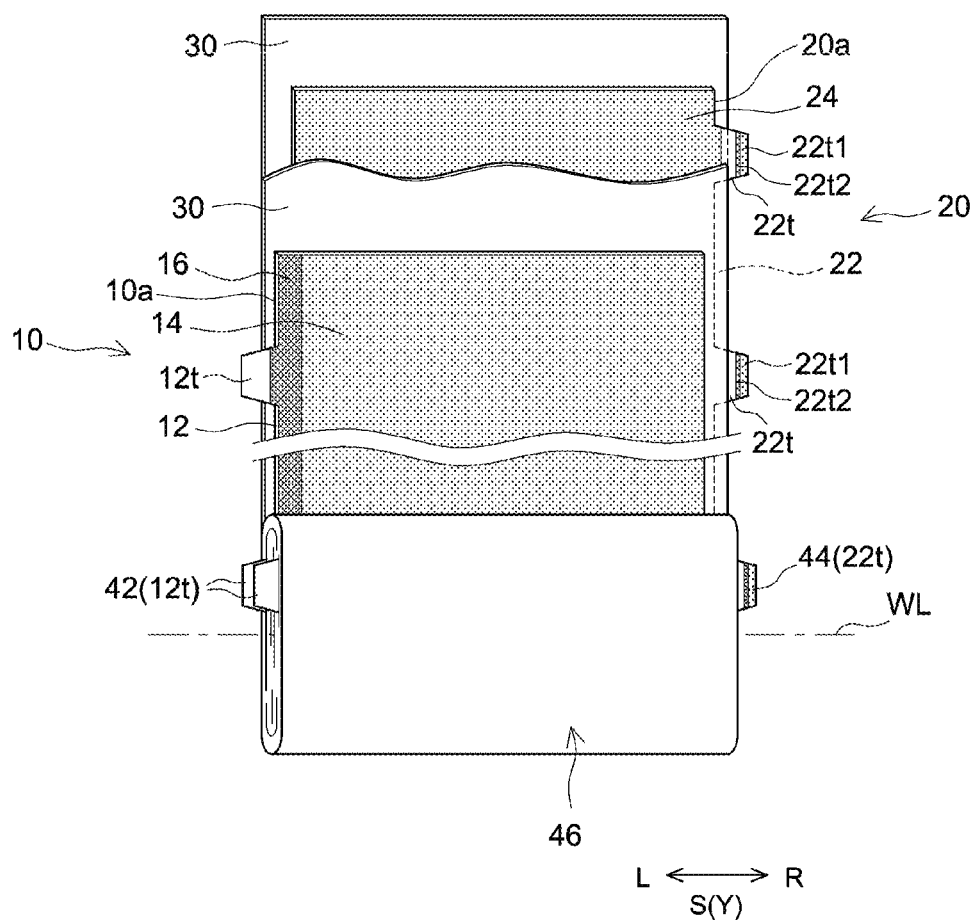
FIG. 7 is a schematic view showing a configuration of a wound electrode body of a secondary battery according to an embodiment.
Figure 8:
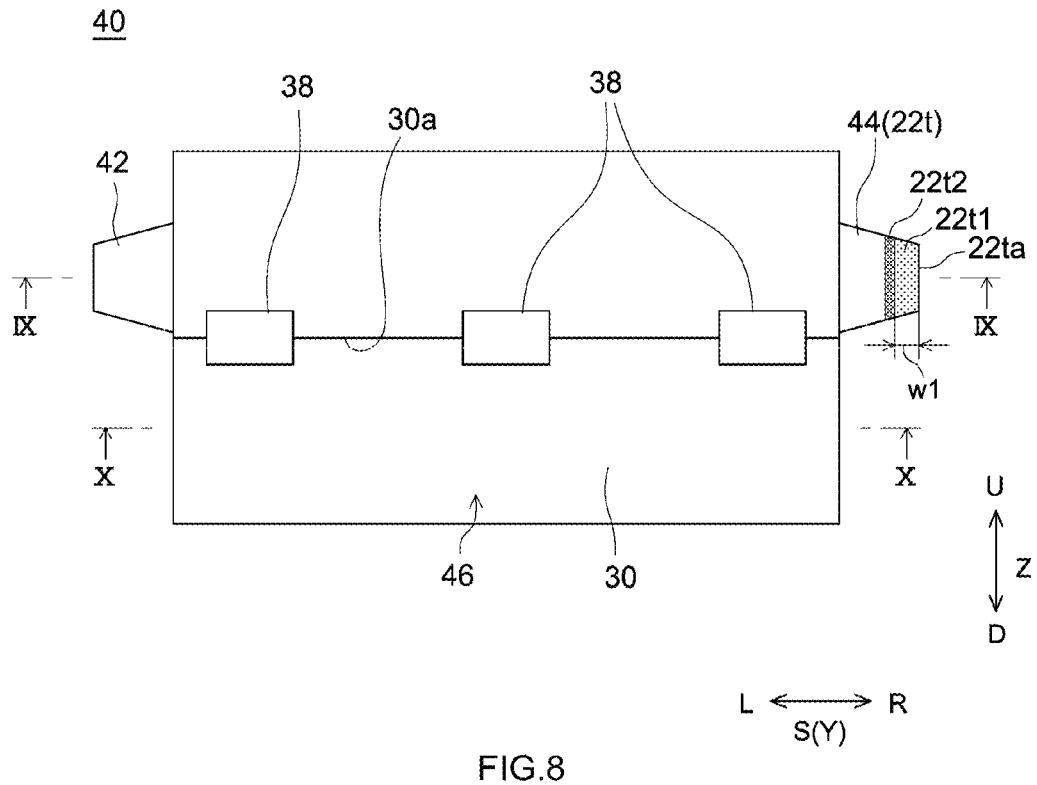
FIG. 8 is a front view schematically showing the wound electrode body of FIG. 7.
Figure 9:
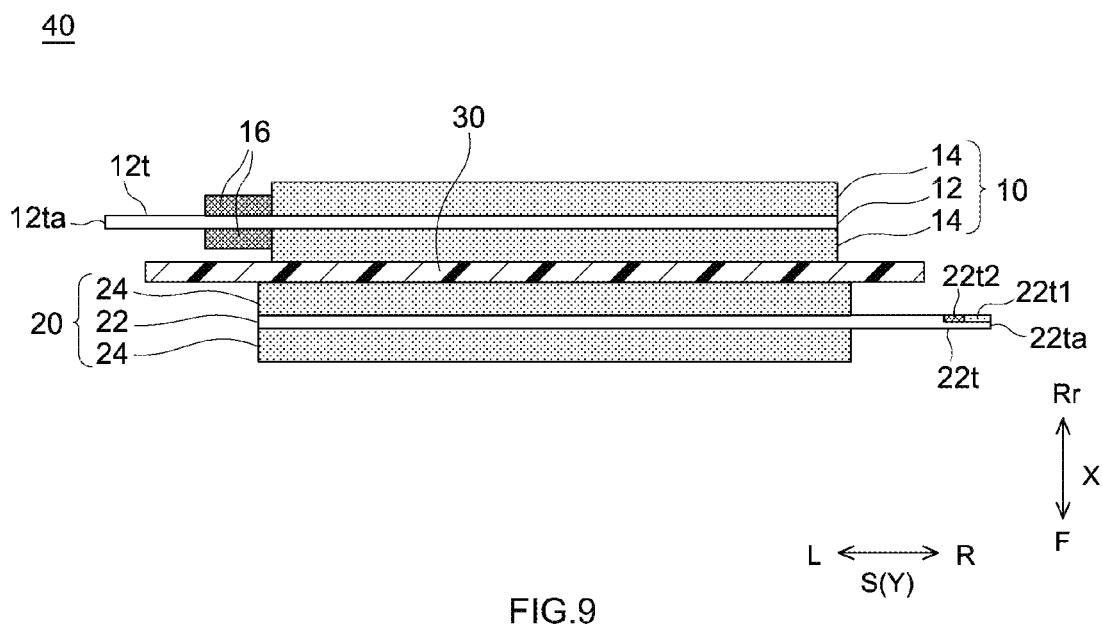
FIG. 9 is a view shown by arrows IX-IX in FIG. 8.
Figure 10:
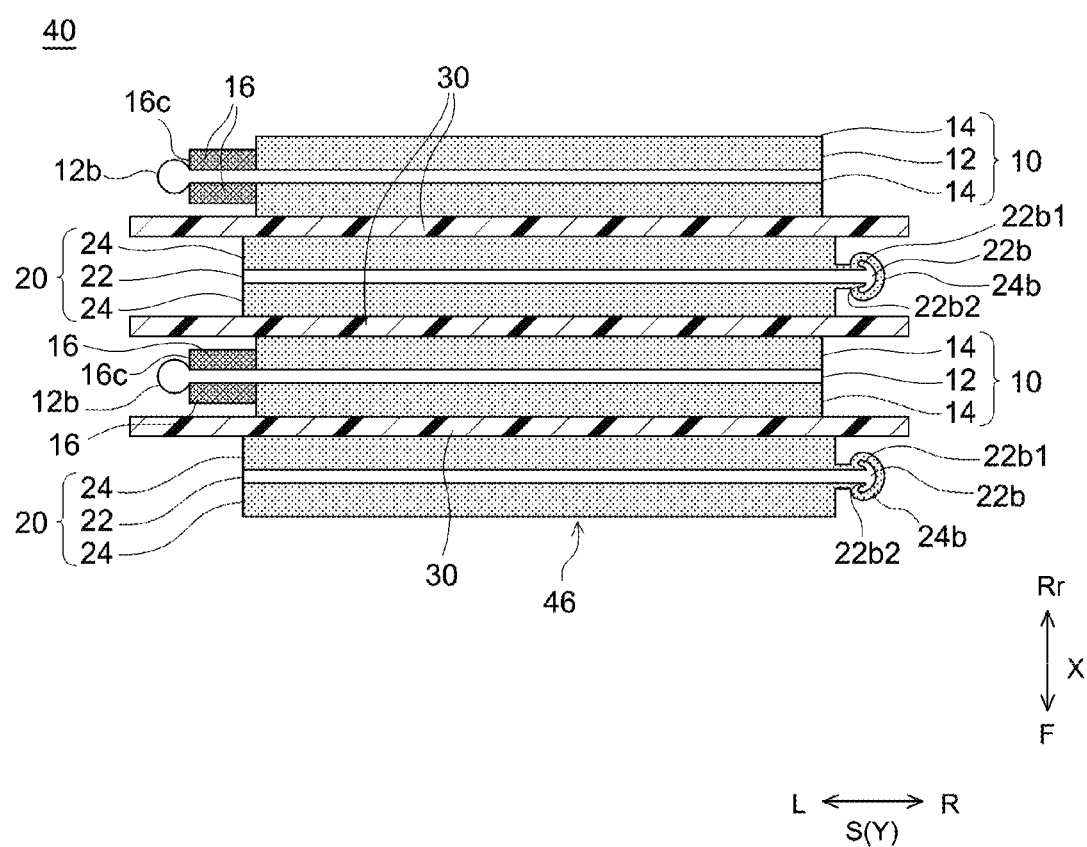
FIG. 10 is a view taken along the line X-X in FIG. 8.

Hereinafter, a secondary battery using the electrode plate disclosed herein will be described as an embodiment of the technique disclosed herein. FIG. 1 is a perspective view schematically showing a secondary battery according to the present embodiment. FIG. 2 is a schematic vertical sectional view taken along the line II-II in FIG. 1. FIG. 3 is a schematic vertical sectional view taken along the line in FIG. 1. FIG. 4 is a schematic cross-sectional view taken along the line IV-IV in FIG. 1. FIG. 5 is a perspective view schematically showing an electrode body attached to a sealing plate. FIG. 6 is a perspective view schematically showing an electrode body to which a positive electrode second current collector and a negative electrode second current collector are attached. FIG. 7 is a schematic view showing the configuration of the wound electrode body of the secondary battery according to the present embodiment. FIG. 8 is a front view schematically showing the wound electrode body of FIG. 7. FIG. 9 is a view shown by arrows IX-IX in FIG. 8. FIG. 10 is a view taken along the line X-X in FIG. 8. In these figures, reference symbol X indicates a "depth direction", reference symbol Y indicates a "width direction", and reference symbol Z indicates a "vertical direction". Further, F in the depth direction X indicates "front" and Rr indicates "rear". L in the width direction Y indicates "left" and R indicates "right". Then, U in the vertical direction Z indicates "up" and D indicates "down". However, these directions are defined for convenience of explanation, and are not intended to limit the installation form of the secondary battery 100.

As shown in FIGS. 2 and 7, the secondary battery 100 according to the present embodiment includes a wound electrode body 40 having a pair of electrode plates (positive electrode plate 10 and negative electrode plate 20). Hereinafter, a specific configuration of the secondary battery 100 will be described.

Battery Case

The battery case 50 is a housing for accommodating the wound electrode body 40.

Here, the battery case 50 has a flat and bottomed rectangular parallelepiped outer shape. The material of the battery case 50 may be the same as that conventionally used, and there is no particular limitation. The battery case 50 is preferably made of metal, and more preferably made of, for example, aluminum, an aluminum alloy, iron, an iron alloy, or the like. As shown in FIG. 2, the battery case 50 includes an exterior body 52 and a sealing plate 54.

The exterior body 52 is a flat bottomed square container having an opening 52h on the upper surface. As shown in FIG. 1, the exterior body 52 has a bottom wall 52a having a substantially rectangular planar shape, a pair of long side walls 52b extending from the long sides of the bottom wall 52a in the vertical direction Z, and a pair of short side walls 52c extending from the short sides of the bottom wall 52a in the vertical direction Z. Meanwhile, the sealing plate 54 is a plate-shaped member having a substantially rectangular planar shape that closes the opening 52h of the exterior body 52. The outer peripheral edge of the sealing plate 54 is joined (for example, welded) to the outer peripheral edge of the opening 52h of the exterior body 52. As a result, the battery case 50 with an airtightly closed (sealed) interior is produced. Further, the sealing plate 54 is provided with a liquid injection hole 55 and a gas discharge valve 57. The liquid injection hole 55 is provided for injecting a non-aqueous electrolytic solution into the inside of the battery case 50 after joining the exterior body 52 and the sealing plate 54. The liquid injection hole 55 is sealed by the sealing member 56 after the non-aqueous electrolytic solution is injected. Further, the gas discharge valve 57 is a thin portion designed to break (open) at a predetermined pressure and discharge the gas contained in the battery case 50 when a large amount of gas is generated in the battery case 50.

Non-Aqueous Electrolytic Solution

Although not shown, a non-aqueous electrolytic solution is accommodated in addition to the wound electrode body 40 inside the battery case 50. This non-aqueous electrolytic solution is prepared by dissolving a supporting salt in a non-aqueous solvent. Examples of non-aqueous solvents include carbonate solvents such as ethylene carbonate, dimethyl carbonate, ethyl methyl carbonate, and the like. As an example of the supporting salt, a fluorine-containing lithium salt such as $LiPF_6$ can be mentioned.

Electrode Terminals

Further, the positive electrode terminal 60 is attached to one end of the sealing plate 54 (left side in FIGS. 1 and 2) of the secondary battery 100 in the width direction Y. The positive electrode terminal 60 is connected to a plate-shaped positive electrode external conductive member 62 on the outside of the battery case 50. Meanwhile, a negative electrode terminal 65 is attached to the other end of the sealing plate 54 (right side in FIGS. 1 and 2) of the secondary battery 100 in the width direction Y. A plate-shaped negative electrode external conductive member 67 is also attached to the negative electrode terminal 65. These external conductive members (positive electrode external conductive member 62 and negative electrode external conductive member 67) are connected to another secondary battery or external device via an external connecting member (bus bar or the like). The external conductive members are preferably made of a metal having excellent conductivity (aluminum, aluminum alloy, copper, copper alloy, and the like).

Electrode Current Collector

As shown in FIGS. 3 to 5, in the secondary battery 100 according to the present embodiment, a plurality of (three in the figure) wound electrode bodies 40 is accommodated inside the battery case 50. Although the detailed structure will be described hereinbelow, each wound electrode body 40 is provided with a positive electrode tab group 42 and a negative electrode tab group 44. The positive electrode terminal 60 is connected to each positive electrode tab group 42 of the plurality of wound electrode bodies 40 via a positive electrode current collector 70 accommodated in the battery case 50. Specifically, the positive electrode current collector 70 that connects the positive electrode terminal 60 and the wound electrode body 40 is accommodated inside the battery case 50. As shown in FIGS. 2 and 5, the positive electrode current collector 70 has a positive electrode first current collector 71 that is a plate-shaped conductive member extending along the inner side surface of the sealing plate 54, and a plurality of positive electrode second current collectors 72 that is plate-shaped conductive members extending along the vertical direction Z. A lower end portion 60c of the positive electrode terminal 60 extends toward the inside of the battery case 50 through a terminal insertion hole 58 of the sealing plate 54 and is connected to the positive electrode first current collector 71 (see FIG. 2). Meanwhile, as shown in FIGS. 4 to 6, each positive electrode second current collector 72 is connected to the respective positive electrode tab group 42 of the plurality of wound electrode bodies 40. As shown in FIGS. 4 and 5, the positive electrode tab group 42 of the wound electrode body 40 is bent so that the positive electrode second current collector 72 and one side surface 40a of the wound electrode body 40 face each other. As a result, the upper end portion of the positive electrode second current collector 72 and the positive electrode first current collector 71 are electrically connected to each other.

Meanwhile, the negative electrode terminal 65 is connected to the respective negative electrode tab groups 44 of the plurality of wound electrode bodies 40 via a negative electrode current collector 75 accommodated in the battery case 50. The connection structure on the negative electrode side is substantially the same as the connection structure on the positive electrode side described above. Specifically, the negative electrode current collector 75 has a negative electrode first current collector 76 that is a plate-shaped conductive member extending along the inner surface of the sealing plate 54, and a plurality of negative electrode second current collectors 77 that is plate-shaped conductive members extending along the vertical direction Z (see FIGS. 2 and 5). A lower end portion 65c of the negative electrode terminal 65 extends toward the inside of the battery case 50 through a terminal insertion hole 59 and is connected to the negative electrode first current collector 76 (see FIG. 2). Meanwhile, each negative electrode second current collector 77 is connected to the respective negative electrode tab group 44 of the plurality of wound electrode bodies 40 (see FIGS. 4 to 6). The negative electrode tab group 44 is bent so that the negative electrode second current collector 77 and the other side surface 40b of the wound electrode body 40 face each other. As a result, the upper end portion of the negative electrode second current collector 77 and the negative electrode first current collector 76 are electrically connected to each other.

Insulating Members

Further, in the secondary battery 100 according to the present embodiment, various insulating members for preventing conduction between the wound electrode body 40 and the battery case 50 are attached. Specifically, an external insulating member 92 is interposed between the positive electrode external conductive member 62 (negative electrode external conductive member 67) and the outer surface of the sealing plate 54 (see FIG. 1). This makes it possible to prevent the positive electrode external conductive member 62 and the negative electrode external conductive member 67 from conducting with the sealing plate 54. Further, a gasket 90 is attached to each of the terminal insertion holes 58 and 59 of the sealing plate 54 (see FIG. 2). As a result, it is possible to prevent the positive electrode terminal 60 (and the negative electrode terminal 65) inserted through the terminal insertion holes 58 and 59 from conducting with the sealing plate 54. Further, an internal insulating member 94 is arranged between the positive electrode first current collector 71 (or the negative electrode first current collector 76) and the inner side surface of the sealing plate 54. The internal insulating member 94 includes a plate-shaped base portion 94a interposed between the positive electrode first current collector 71 (or the negative electrode first current collector 76) and the inner side surface of the sealing plate 54. As a result, it is possible to prevent the positive electrode first current collector 71 and the negative electrode first current collector 76 from conducting with the sealing plate 54. Further, the internal insulating member 94 includes a protruding portion 94b that protrudes from the inner side surface of the sealing plate 54 toward the wound electrode body 40 (see FIGS. 2 and 3). As a result, the movement of the wound electrode body 40 in the vertical direction Z can be restricted, and the wound electrode body 40 and the sealing plate 54 can be prevented from coming into direct contact with each other. In addition, the wound electrode body 40 is accommodated inside the battery case 50 in a state of being covered with an electrode body holder 98 (see FIG. 3) made of an insulating resin sheet. As a result, it is possible to prevent the wound electrode body 40 and the exterior body 52 from coming into direct contact with each other. The material of each of the above-mentioned insulating members is not particularly limited as long as it has a predetermined insulating property. As an example, synthetic resin materials such as polyolefin resins (for example, polypropylene (PP) and polyethylene (PE)) and fluororesins (for example, perfluoroalkoxyalkanes (PFA) and polytetrafluoroethylene (PTFE)) can be used.

Wound Electrode Body

As described above, the secondary battery 100 according to the present embodiment includes a wound electrode body 40 having a pair of electrode plates. As shown in FIG. 7, one of the pair of electrode plates is a positive electrode plate 10 and the other is a negative electrode plate 20. More specifically, in the wound electrode body 40 of the present embodiment, the strip-shaped positive electrode plate 10 and the strip-shaped negative electrode plate 20 are wound with the strip-shaped separator 30 interposed therebetween. The secondary battery 100 according to the present embodiment is configured such that the winding axis WL of the wound electrode body 40, the lateral direction S of the pair of electrode plates (positive electrode plate 10 and the negative electrode plate 20), and the width direction Y of the battery case 50 substantially coincide. Hereinafter, the configuration of the wound electrode body 40 will be specifically described.

Positive Electrode Plate

First, as shown in FIG. 7, the positive electrode plate 10 is a long strip-shaped member. The positive electrode plate 10 has a positive electrode core 12 which is a foil-shaped metal member, a positive electrode active material layer 14 applied to the surface of the positive electrode core 12, and a protective layer 16 applied to the surface of the positive electrode core 12 so as to be adjacent to an end side 10a of the positive electrode plate 10. From the viewpoint of battery performance, it is preferable that the positive electrode active material layer 14 and the protective layer 16 be applied to both surfaces of the positive electrode core 12. Further, the protective layer 16 may be applied so that a part thereof covers the end side of the positive electrode active material layer 14. Furthermore, the positive electrode plate 10 is provided with positive electrode tabs 12t that protrude to the outside (left side in FIG. 7) from the one end side 10a in the width direction Y (the lateral direction S of the positive electrode plate 10). A plurality of the positive electrode tabs 12t is formed at predetermined intervals in the longitudinal direction L of the positive electrode plate 10.

The positive electrode tab 12*t* is a region where the positive electrode active material layer 14 and the protective layer 16 are not provided and the positive electrode core 12 is exposed.

For each member constituting the positive electrode plate 10, a conventionally known material that can be used in a general secondary battery (for example, a lithium ion secondary battery) can be used without particular limitation. For example, a metal material having a predetermined conductivity can be suitably used for the positive electrode core 12. The positive electrode core 12 is preferably configured of, for example, aluminum, an aluminum alloy, or the like. The thickness of the positive electrode core 12 is preferably 3 µm to 30 µm, more preferably 3 µm to 20 µm, and even more preferably 5 µm to 15 µm.

Further, the positive electrode active material layer 14 includes a positive electrode active material. The positive electrode active material is a material capable of reversibly occluding and releasing charge carriers. From the viewpoint of stably producing a high-performance positive electrode plate 10, a lithium transition metal composite oxide is preferable as the positive electrode active material. Among the lithium transition metal composite oxides, a lithium transition metal composite oxide including at least one of the group consisting of nickel (Ni), cobalt (Co) and manganese (Mn) as the transition metal is particularly suitable. Specific examples include lithium-nickel-cobalt-manganese-based composite oxides (NCM), lithium-nickel-based composite oxides, lithium-cobalt-based composite oxides, lithium-manganese-based composite oxides, lithium-nickel-manganese-based composite oxides, lithium-nickel-cobalt-aluminum-based composite oxides (NCA), lithium-iron-nickel-manganese-based composite oxides, and the like. Moreover, as a preferable example of a lithium transition metal composite oxide containing no nickel, cobalt or manganese, a lithium-iron phosphate-based composite oxide (LFP) and the like can be mentioned. The term "lithium-nickel-cobalt-manganese-based composite oxide" as used in the present description is a term inclusive of oxides containing additive elements in addition to the main constituent elements (Li, Ni, Co, Mn, O). Examples of such additive elements include transition metal elements and typical metal elements such as Mg, Ca, Al, Ti, V, Cr, Si, Y, Zr, Nb, Mo, Hf, Ta, W, Na, Fe, Zn, Sn, and the like. Further, the additive element may be a metalloid element such as B, C, Si, P, and the like or a non-metal element such as S, F, Cl, Br, I, and the like. This also applies to other lithium transition metal composite oxides described as " . . . -based composite oxides". Further, the positive electrode active material layer 14 may include additives other than the positive electrode active material. Examples of such additives include conductive materials, binders, silicon-based materials, and the like. Specific example of the conductive material is a carbon material such as acetylene black (AB). Specific example of the binder is a resin binder such as polyvinylidene fluoride (PVdF). When the total solid content of the positive electrode active material layer 14 is 100% by mass, the content of the positive electrode active material is approximately 80% by mass or more, and typically 90% by mass or more. The positive electrode active material may constitute 95% by mass or more of the positive electrode active material layer 14. The thickness of the positive electrode active material layer 14 is preferably 10 µm to 500 µm, more preferably 30 µm to 400 µm, and even more preferably 50 µm to 300 µm.

Meanwhile, the protective layer 16 is configured to have lower electrical conductivity than the positive electrode active material layer 14. By applying the protective layer 16 so as to be adjacent to the end side 10*a* of the positive electrode plate 10, the internal short circuit due to contact between the positive electrode core 12 and the negative electrode active material layer 24 when the separator 30 of the wound electrode body 40 is damaged can be prevented. For example, it is preferable to form a layer including insulating ceramic particles as the protective layer 16. Examples of such ceramic particles include inorganic oxides such as alumina ($Al_2O_3$), magnesia (MgO), silica ($SiO_2$), titania ($TiO_2$), and the like, nitrides such as aluminum nitride, silicon nitride, and the like, metal hydroxides such as calcium hydroxide, magnesium hydroxide, aluminum hydroxide, and the like, clay minerals such as mica, talc, boehmite, zeolite, apatite, kaolin, and the like, glass fibers, and the like. Among the above, alumina, boehmite, aluminum hydroxide, silica and titania are preferable in consideration of insulation and heat resistance. Further, the protective layer 16 may include a binder for fixing the ceramic particles to the surface of the positive electrode core 12. Examples of such a binder include a resin binder such as polyvinylidene fluoride (PVdF) and the like. The protective layer 16 may have lower electrical conductivity than the positive electrode active material layer 14, and is not limited to the above configuration. For example, the protective layer 16 may be configured of an insulating resin instead of the ceramic particles. Further, a small amount of a conductive material such as a carbon material (acetylene black) may be added to the protective layer 16. Further, the thickness of the protective layer 16 is preferably less than the thickness of the positive electrode active material layer 14. For example, the thickness of the protective layer 16 is preferably 1 µm to 100 µm, more preferably 5 µm to 80 µm, and even more preferably 8 µm to 50 µm. The protective layer described above is not an essential component of the positive electrode plate. That is, in the secondary battery disclosed herein, a positive electrode plate on which a protective layer is not formed can also be used.

Further, as shown in FIG. 10, it is preferable that a positive electrode thick portion 12*b* having a thickness larger than the thickness of the positive electrode core 12 in the central region of the positive electrode plate 10 be formed at the end of the positive electrode core 12 on the end side 10*a* (the left end side in FIG. 7) on the side adjacent with the protective layer 16 of the positive electrode plate 10. As will be described in detail hereinbelow, where a continuous wave laser is used when cutting out the positive electrode plate 10 from the positive electrode precursor 10A (see FIG. 12), a positive electrode thick portion 12*b* is formed at the end of the positive electrode core 12. In other words, the positive electrode thick portion 12*b* is a region having a substantially spherical cross section formed as a result of solidification of the positive electrode core 12 once melted by the heat of the continuously oscillating laser. By forming the positive electrode thick portion 12*b* at the end of the positive electrode core 12, the movement of the protective layer 16 in the width direction Y is restricted, so that the protective layer 16 can be prevented from falling off. Although not shown for convenience of explanation, the positive electrode thick portion 12*b* is also formed on an outer end side 12*ta* of the positive electrode tab 12*t* of the positive electrode plate 10 shown in FIG. 9.

Further, it is preferable that the positive electrode thick portion 12*b* protrude to the outside (on the left side in the width direction Y in FIG. 10) from the end surface 16*c* of the protective layer 16. As a result, the movement of the protective layer 16 in the width direction Y can be more adequately regulated, and the protective layer 16 can be suitably prevented from falling off. From the viewpoint of more adequately retaining the protective layer 16 by the positive electrode thick portion 12b, it is preferable that the thickness of the positive electrode thick portion 12b (dimension in the depth direction X in FIG. 10) be 15 μm to 50 μm. The "thickness of the positive electrode thick portion 12b" in the present description refers to the maximum dimension of the positive electrode thick portion 12b in the thickness direction of the wound electrode body (depth direction X in FIG. 10).

Negative Electrode Plate

As shown in FIG. 7, the negative electrode plate 20 in this embodiment is a long strip-shaped member. The negative electrode plate 20 includes a negative electrode core 22 which is a foil-shaped metal member, and a negative electrode active material layer 24 applied to the surface of the negative electrode core 22. From the viewpoint of battery performance, it is preferable that the negative electrode active material layer 24 be applied to both surfaces of the negative electrode core 22. Further, the negative electrode plate 20 is provided with negative electrode tabs 22t that protrude to the outside (right side in FIG. 7) from one end side 20a in the width direction Y (the lateral direction S of the negative electrode plate 20). A plurality of the negative electrode tabs 22t is provided at predetermined intervals in the longitudinal direction L of the negative electrode plate 20. The negative electrode tab 22t is a region where the negative electrode active material layer 24 is not applied and the negative electrode core 22 is exposed. Further, the negative electrode active material layer 24 is adjacent to the end side 20a located between the plurality of negative electrode tabs 22t. In other words, in the present embodiment, the negative electrode active material layer 24 is applied to the surface of the negative electrode core 22 in the region adjacent to the end side 20a so that the negative electrode core 22 is not exposed in the region other than the negative electrode tabs 22t. By reducing the exposed region of the negative electrode core 22 in this way, it is possible to prevent metal pieces from peeling off from a portion other than the negative electrode tabs 22t.

In the secondary battery 100 according to the present embodiment, an electrode core (copper electrode core) including copper or a copper alloy is used as the negative electrode core 22. In other words, the negative electrode core 22 in the present embodiment is a strip-shaped metal member including copper or a copper alloy. From the viewpoint of easily forming an oxide film having an adequate thickness in the first region 22t1 described hereinbelow, the negative electrode core 22 is preferably a metal member including a copper element as a main component. Here, the "metal member including a copper element as a main component" refers to a metal member in which the ratio of the copper element to all the constituent elements is 90% or more (preferably 92% or more, more preferably 95% or more, particularly preferably 99% or more). The thickness of the negative electrode core 22 is preferably 3 μm to 30 μm, more preferably 3 μm to 20 μm, and even more preferably 5 μm to 15 μm.

Further, the negative electrode active material layer 24 is a layer including a negative electrode active material. The negative electrode active material is not particularly limited as long as the charge carriers can be reversibly occluded and released in relation to the positive electrode active material described above, and a material that can be used in a conventional general secondary battery can be used without particular limitation. Examples of such a negative electrode active material include a carbon material, a silicon-based material, and the like. As the carbon material, for example, graphite, hard carbon, soft carbon, amorphous carbon, and the like can be used. Further, amorphous carbon-coated graphite obtained by coating the surface of graphite with amorphous carbon can also be used. Meanwhile, examples of the silicon-based material include silicon, silicon oxide (silica), and the like. Further, the silicon-based material may include other metal elements (for example, alkaline earth metals) and oxides thereof. Further, the negative electrode active material layer 24 may include an additive other than the negative electrode active material. Examples of such an additive include a binder, a thickener, and the like. Specific examples of the binder include rubber-based binders such as styrene-butadiene rubber (SBR) and the like. Further, specific examples of the thickener include carboxymethyl cellulose (CMC) and the like. When the total solid amount of the negative electrode active material layer 24 is 100% by mass, the amount of the negative electrode active material is approximately 30% by mass or more, and typically 50% by mass or more. The negative electrode active material may occupy 80% by mass or more, or may occupy 90% by mass or more of the negative electrode active material layer 24. The thickness of the negative electrode active material layer 24 is preferably 10 μm to 500 μm, more preferably 30 μm to 400 μm, and even more preferably 50 μm to 300 μm.

As shown in FIGS. 7 to 9, in the secondary battery 100 according to the present embodiment, a first region 22t1 having an oxide film having a thickness of 40 nm or more is formed on the electrode tab (negative electrode tab 22t) of the negative electrode plate 20. The length of the first region 22t1 (width w1 of the first region 22t1 in FIG. 8) from the outer end side 22ta of the negative electrode tab 22t toward the inside in the width direction Y is 0.01 mm or more. The first region 22t1 is formed so as to extend along the outer end side 22ta of the negative electrode tab 22t. That is, in the secondary battery 100 according to the present embodiment, an oxide film having a certain thickness and area or more is intentionally formed on the surface of the negative electrode tab 22t. As a result, a metal piece that can be peeled off from the negative electrode tab 22t can be insulated and inactivated in advance, so that an internal short circuit caused by the peeled metal piece can be suppressed.

As described above, in the present embodiment, the width w1 of the first region 22t1 is required to be 0.01 mm or more in order to adequately insulate and inactivate the metal piece. From the viewpoint of increasing the area occupied by the oxide film (first region 22t1) on the surface of the negative electrode tab 22t and more suitably insulating and inactivating the metal piece, the width w1 of the first region 22t1 is preferably 0.05 mm or more, and particularly preferably 0.1 mm or more. Meanwhile, where the area occupied by the oxide film on the surface of the negative electrode tab 22t becomes too large, the electrical resistance at the connection interface between the negative electrode second current collector 77 and the negative electrode tab 22t may increase significantly. From this point of view, in the secondary battery 100 according to the present embodiment, the upper limit of the width w1 of the first region 22t1 is limited to 0.2 mm or less.

Further, in the present embodiment, in order to adequately insulate and inactivate the metal piece, the thickness of the oxide film in the first region 22t1 is required to be 40 nm or more. However, from the viewpoint of more suitably insulating and inactivating the metal piece, the thickness of the oxide film in the first region 22t1 is preferably 50 nm or more, and particularly preferably 70 nm or more. Meanwhile, from the viewpoint of suppressing peeling of the oxide film, the thickness of the oxide film in the first region 2211 is limited to 200 nm or less. The "thickness of the oxide film" in the present description is determined based on "Definition of the relationship between the surface color of an oxide film and the thickness of the oxide film" by Miley & Evans shown in Table 1 hereinbelow.

TABLE 1

| | | Thickness of copper oxide film |
|---|---|---|
| Surface color of copper oxide film | Dark brown | 37 |
| | Reddish brown | 41 |
| | Violet | 46 |
| | Purple | 48.5 |
| | Blue | 52 |
| | Silver/green | 80 |
| | Yellow | 94 |
| | Orange | 117 |
| | Red | 124 |

Further, a second region 2212 is provided at the negative electrode tab 22t in the present embodiment so as to be adjacent to the inside of the first region 22t1 in the width direction Y (left side in FIGS. 7 to 9). In the second region 2212, the thickness of the oxide film gradually decreases toward the inside in the width direction Y. By placing the second region 22t2 adjacent to the first region 2211 and eliminating the clear boundary between the first region 22t1 and the non-oxidized region, the oxide film can be more fixedly attached to the non-oxidized region and peeling of the oxide film can be suppressed more suitably.

Further, it is preferable that a negative electrode thick portion 22b having a thickness larger than that of the negative electrode core 22 in the central region of the negative electrode plate 20 be formed, as shown in FIG. 10, at the end portion of the negative electrode core 22 at the end side 20a (see FIG. 7) of the negative electrode plate 20. As will be described in detail hereinbelow, when a pulsed laser is used when cutting out the negative electrode plate 20 from the negative electrode precursor 20A (see FIG. 13), the negative electrode thick portion 22b is formed at the end of the negative electrode core 22. More specifically, the negative electrode thick portion 22b is formed as a result of solidification of the negative electrode core 22 once melted by the heat from the pulsed laser. By forming the negative electrode thick portion 22b at the end of the negative electrode core 22, the movement of the negative electrode active material layer 24 in the width direction Y can be restricted, and the negative electrode active material layer 24 can be suitably prevented from peeling off. Although not shown for convenience of explanation, the negative electrode thick portion 22b is also formed on the end side 22ta of the negative electrode tab 22t of the negative electrode plate 20 shown in FIG. 9.

Further, the negative electrode thick portion 22b preferably has a claw shape provided with a cap portion 22b1 protruding on both sides or one side in the thickness direction (depth direction X in FIG. 10) of the negative electrode core 22, and a recess 22b2 formed between the cap portion 22b1 and the negative electrode core 22. Unlike the positive electrode thick portion 12b, the negative electrode thick portion 22b is formed by solidification of the negative electrode core 22 once melted by the heat from the pulsed laser, and thus may have a claw shape as described above. The coating layer 24b is embedded in the recess 22b2 of the claw-shaped negative electrode thick portion 22b. As a result, an excellent anchoring effect is exhibited, and the coating layer 24b can be firmly held. As a consequence, it is possible to more preferably prevent the conductive foreign matter (negative electrode active material layer 24, coating layer 24b) from falling off or peeling off. Where such a claw-shaped negative electrode thick portion 22b is formed on the negative electrode core 22, the separator 30 in contact with the negative electrode thick portion 22b may be damaged. However, in the present embodiment, since the negative electrode thick portion 22b is covered with the coating layer 24b, it is possible to suitably prevent the separator 30 from being damaged by the claw-shaped negative electrode thick portion 22b.

The thickness of the cap portion 22b1 of the negative electrode thick portion 22b is preferably 1 μm or more, more preferably 2.5 μm or more, and still more preferably 4 μm or more. As a result, a more suitable anchoring effect can be exhibited. The "thickness of the cap portion" is the thickness of one side of the cap portion 22b1 with respect to the surface of the core (dimension in the lateral direction X in FIG. 10). Further, from the viewpoint of more reliably preventing damage to the separator 30, the upper limit of the thickness of the cap portion 22b1 is preferably 30 μm or less, more preferably 25 μm or less, and still more preferably 20 μm or less. Meanwhile, the width of the cap portion 22b1 (dimension in the width direction Y in FIG. 10) is not particularly limited. For example, the width of the cap portion 22b1 may be 1 μm to 30 μm, 5 μm to 25 μm, or 10 μm to 20 μm. Further, the height of the inlet of the recess 22b2 of the negative electrode thick portion 22b (dimension in the depth direction X in FIG. 10) is preferably 1 μm to 10 μm, and more preferably 2.5 μm to 7.5 μm. Meanwhile, the depth of the recess 22b2 of the negative electrode thick portion 22b (dimension in the width direction Y in FIG. 10) is preferably 0.1 to 10 μm, and more preferably 2.5 μm to 7.5 μm. As a result, an adequate amount of the coating layer 24b can be held inside the recess 22b2, and a more suitable anchoring effect can be exhibited. Further, the angle at which the cap portion 22b1 rises from the surface of the negative electrode core 22 is preferably more than 0° and 90° or less.

Meanwhile, the ratio of the thickness of the coating layer of the negative electrode thick portion 22b to the thickness of the negative electrode active material layer 24 is preferably 0.01 to 0.2. By setting the ratio of the thickness of the negative electrode thick portion 22b to the thickness of the negative electrode active material layer 24 to 0.2 or less in this way, it is possible to prevent the coating layer of the negative electrode thick portion 22b from peeling off or falling off. Meanwhile, by setting the above ratio to 0.01 or more, it is possible to prevent the negative electrode thick portion 22b from coming into contact with the separator 30 and more suitably prevent the separator 30 from being damaged.

Further, it is preferable that the coating layer 24b adhere, as shown in FIG. 10, to the surface of the negative electrode thick portion 22b formed on the end side 20a (see FIG. 7) of the negative electrode plate 20 adjacent to the negative electrode active material layer 24. The coating layer 24b is obtained by modification of the negative electrode active material layer 24 by the heat of the pulsed laser. Specifically, the coating layer 24b is obtained by densification of the negative electrode active material in the negative electrode active material layer 24, or a carbon material (or a compound including a carbon element) such as a carbonized additive (binder or the like). Since the coating layer 24b has excellent adhesion to the surface of the negative electrode core 22 (negative electrode thick portion 22b), it is possible to suitably prevent the occurrence of an internal short circuit caused by peeling/falling off of the negative electrode active material layer 24.

Separator

In the wound electrode body 40 of the present embodiment, the separator 30 is arranged between the positive electrode plate 10 and the negative electrode plate 20 described above. The separator 30 is a sheet-shaped member having a function of preventing contact between the positive electrode plate 10 and the negative electrode plate 20 and allowing the charge carriers to pass through. An example of such a separator 30 is a resin sheet in which a plurality of fine pores through which charge carriers can pass are formed. Such a resin sheet preferably includes a resin layer made of a polyolefin resin (for example, polyethylene (PE) or polypropylene (PP)). Further, a heat-resistant layer including an inorganic filler such as alumina, boehmite, aluminum hydroxide, titania, or the like may be formed on the surface of the resin sheet.

Structure of Wound Electrode Body

Next, the specific structure of the wound electrode body 40 including the positive electrode plate 10, the negative electrode plate 20, and the separator 30 described above will be described. The wound electrode body 40 is produced by laminating and winding a positive electrode plate 10 and a negative electrode plate 20 with two separators 30 interposed therebetween. Specifically, first, a laminate is produced in which the separator 30, the negative electrode plate 20, the separator 30, and the positive electrode plate 10 are laminated in this order (see FIG. 7). At this time, lamination is performed by shifting the stacking positions of the sheet-shaped members so that only the positive electrode tabs 12t of the positive electrode plate 10 protrude from one side edge in the width direction Y (left side in FIG. 7), and only the negative electrode tabs 22t of the negative electrode plate 20 protrude from the other side edge (right side in FIG. 7). Then, the laminated body is wound so that the plurality of positive electrode tabs 12t are laminated at the same position on one side edge in the width direction Y, and the plurality of negative electrode tabs 22t are laminated at the same position on the other side edge. The separator 30 is arranged on the outermost circumference of the wound electrode body 40 produced in this manner (see FIG. 8). The shape of the wound electrode body 40 is maintained by attaching a winding stopper tape 38 to a winding end 30a of the separator 30 on the outermost circumference. In the wound electrode body 40, a positive electrode tab group 42 in which a plurality of positive electrode tabs 12t is laminated is formed at one end in the width direction Y. Further, at the other end of the wound electrode body 40 in the width direction Y, a negative electrode tab group 44 in which a plurality of negative electrode tabs 22t is laminated is formed. A core portion 46 in which the positive electrode active material layer 14 and the negative electrode active material layer 24 face each other is formed in the central portion in the width direction Y. The core portion 46 is the main field where the charge/discharge reaction of the secondary battery occurs.

Further, in the electrode body 40 of the present embodiment, the stacking position of each sheet-shaped member is determined so that the boundary between the coating layer 24b of the negative electrode plate 20 and the negative electrode active material layer 24 is located outside the end side of the positive electrode active material layer 14 in the width direction Y. As a result, a decrease in capacity due to precipitation of charge carriers during charging/discharging can be prevented. Specifically, as described above, the merit of the coating layer 24b formed on the negative electrode plate 20 is that peeling off or falling off from the negative electrode core 22 is unlikely, but the drawback is that because the thickness thereof is reduced, the function as a negative electrode active material layer (ability to occlude and release the charge carriers) is poor. Therefore, where the coating layer 24b and the positive electrode active material layer 14 are opposed to each other, the distribution of the charge/discharge reaction on the reaction surface (flat surface of the core portion 46) of the wound electrode body 40 becomes non-uniform, and charge carriers may precipitate. For this reason, it is preferable to arrange the boundary between the coating layer 24b and the negative electrode active material layer 24 in a region not facing the positive electrode active material layer 14 so that the coating layer 24b does not contribute to the charge/discharge reaction.

Method for Manufacturing Secondary Battery

As described above, in the secondary battery 100 according to the present embodiment, the first region 22t1 having an oxide film having a thickness of 40 nm or more is formed on the negative electrode tab 22t of the negative electrode plate 20. The first region 22t1 is formed so as to extend along the outer end side 22ta of the negative electrode tab 22t and have a width w1 of 0.01 mm or more. By forming the oxide film having a thickness and area of a certain level or more in this way, a metal piece that can be peeled off from the negative electrode tab 22t can be insulated and inactivated in advance, so that an internal short circuit caused by the peeled metal piece can be suppressed. Hereinafter, an example of a procedure (method for manufacturing a secondary battery) for forming the above-mentioned first region 22t1 on the negative electrode tab 22t will be described.

Figure 11:
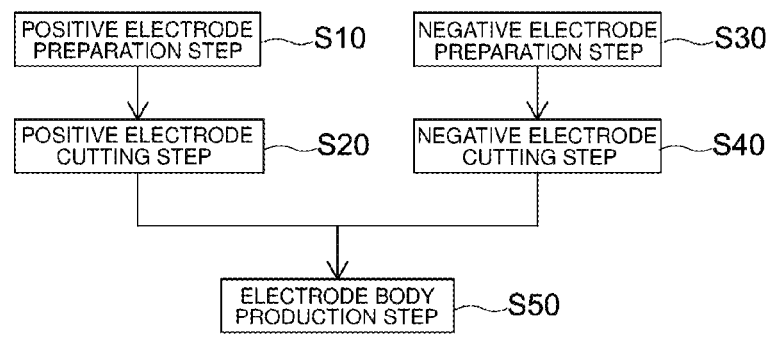
FIG. 11 is a flowchart illustrating an example of a method for manufacturing a secondary battery.
Figure 12:
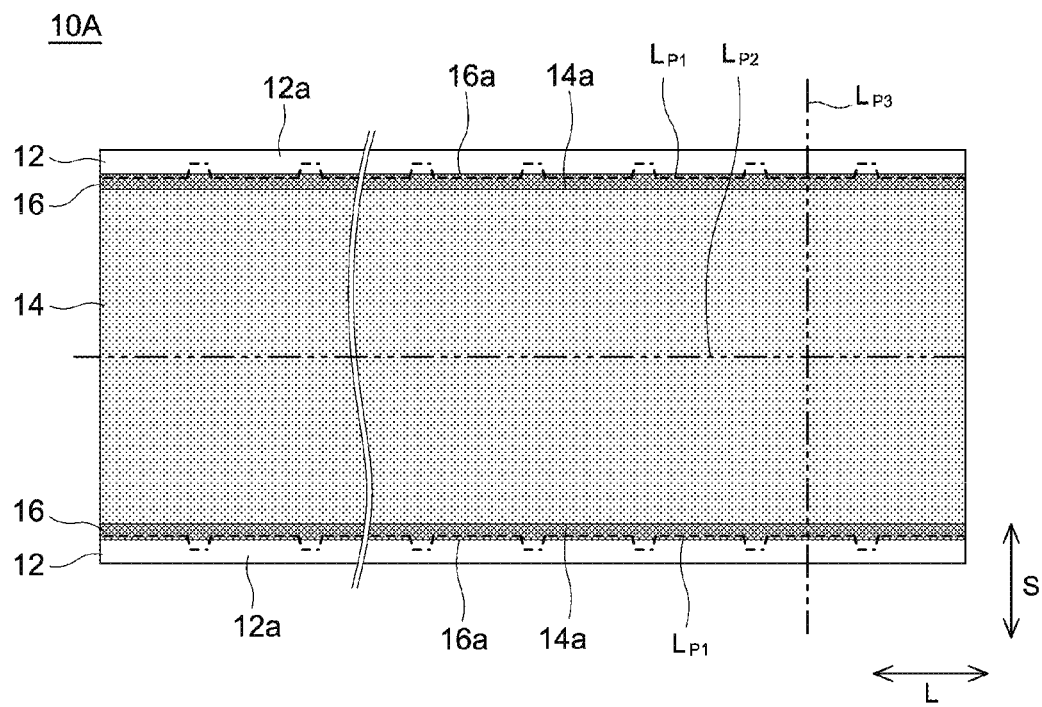
FIG. 12 is a plan view illustrating the production of a positive electrode plate in an example of the method for manufacturing a secondary battery shown in FIG. 11.
Figure 13:
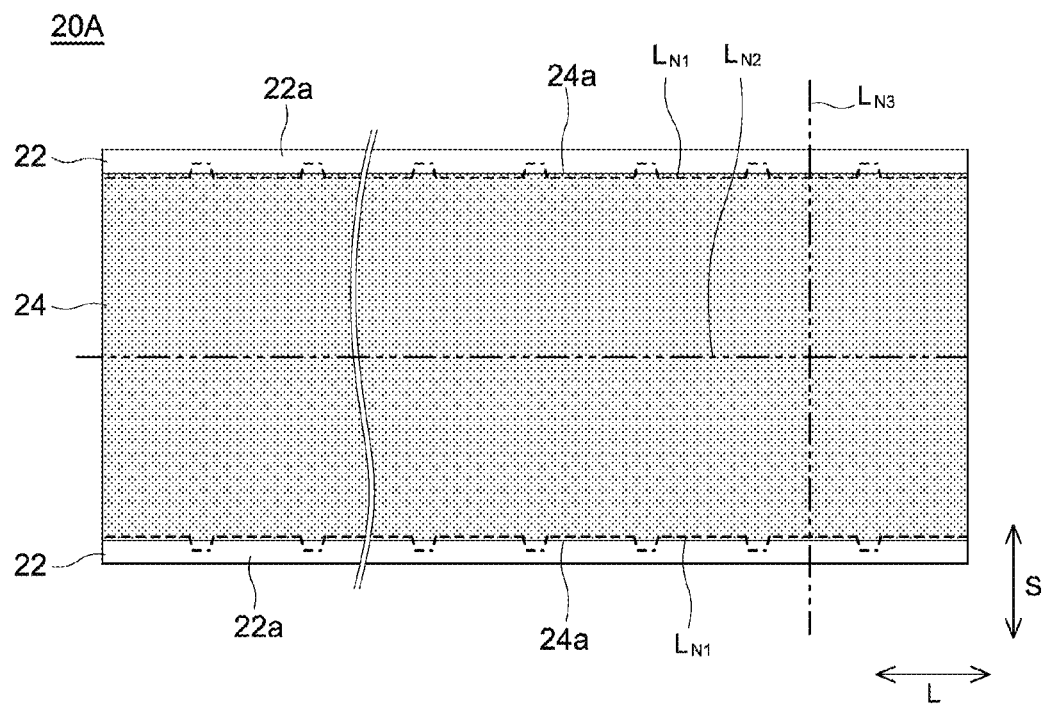
FIG. 13 is a plan view illustrating the production of a negative electrode plate in an example of the method for manufacturing a secondary battery shown in FIG. 11.

FIG. 11 is a flowchart showing an example of a method for manufacturing a secondary battery. FIG. 12 is a plan view illustrating the production of a positive electrode plate in the example of the method for manufacturing a secondary battery shown in FIG. 11. FIG. 13 is a plan view illustrating the production of a negative electrode plate in the example of the method for manufacturing the secondary battery shown in FIG. 11. Reference symbol S in FIGS. 12 and 13 indicates the lateral direction of the electrode plate (positive electrode plate and/or negative electrode plate), and reference symbol L indicates the longitudinal direction of the electrode plate. As described above, the secondary battery 100 according to the present embodiment is configured such that the lateral direction S of the electrode plate and the width direction Y of the battery case 50 substantially coincide with each other. Although details will be described hereinbelow, in the manufacturing method shown in FIG. 11, the first region 22t1 having an oxide film is formed on the negative electrode tab 22t of the negative electrode plate 20 by carrying out a negative electrode preparation step S30 and a negative electrode cutting step S40. In the following, for convenience of explanation, the steps before and after the negative electrode preparation step S30 and the negative electrode cutting step S40 (positive electrode preparation step S10, positive electrode cutting step S20, and electrode body production step S50) will also be described.

Positive Electrode Preparation Step S10

In the manufacturing method illustrated by FIG. 11, first, the positive electrode preparation step S10 of preparing the positive electrode precursor 10A, which is the precursor of the positive electrode plate 10, is carried out. As shown in FIG. 12, the positive electrode precursor 10A includes a positive electrode core 12 which is a strip-shaped metal foil. The area of the positive electrode core 12 of the positive electrode precursor 10A is larger than the area of the positive electrode plate 10 described above. The positive electrode active material layer 14 and the protective layer 16 are applied to the surface of the positive electrode core 12. Specifically, the positive electrode active material layer 14 is applied to the central portion of the positive electrode precursor 10A in the lateral direction S so as to extend along the longitudinal direction L. A pair of protective layers 16 is applied to each region adjacent to the end side 14a of the positive electrode active material layer 14 so as to extend along the longitudinal direction L. The positive electrode active material layer 14 and the protective layer 16 are not applied to both side edges of the positive electrode precursor 10A (regions outside the protective layer 16 in the lateral direction S), and a positive electrode exposed portion 12a where the positive electrode core 12 is exposed is formed. A means for preparing the positive electrode precursor 10A having the above configuration is not particularly limited, and various conventionally known methods can be adopted without particular limitation. For example, the positive electrode precursor 10A can be produced by coating a positive electrode paste which is a precursor of the positive electrode active material layer 14 and a protective paste which is a precursor of the protective layer 16 on the surface (both sides) of the strip-shaped positive electrode core 12, and drying each paste.

Positive Electrode Cutting Step S20

In this step, the positive electrode plate 10 (see FIG. 9) is cut out from the positive electrode precursor 10A having the configuration shown in FIG. 12. For example, in the positive electrode cutting step S20, it is preferable to cut the region to which the protective layer 16 of the positive electrode precursor 10A has been applied (protective layer application region) with a laser. At this time, as shown by a dotted line $L_{P1}$ in FIG. 12, it is preferable to scan the laser on the protective layer 16 along the end side 14a of the positive electrode active material layer 14. As a result, the end side 16a of the protective layer 16 that tends to have a non-uniform thickness is cut off, so that the positive electrode plate 10 having a uniform thickness of the protective layer 16 can be produced. Further, the laser in this step scans toward the outside in the lateral direction S for each constant period to cut a part of the positive electrode exposed portion 12a, and then scans toward the inside in the lateral direction S to cut the protective layer application region again (see dotted line $L_{P1}$). As a result, a part of the positive electrode exposed portion 12a is cut out in a convex shape, and a plurality of positive electrode tabs 12t protruding outward in the lateral direction S is formed. Further, in this step, as shown by a two-dot-dash line $L_{P2}$ in FIG. 12, the central portion of the positive electrode precursor 10A in the lateral direction S is cut along the longitudinal direction L. As a result, the positive electrode plate 10 in which the protective layer 16 and the positive electrode tabs 12t have been formed only on one end side in the lateral direction S can be produced. Further, in this step, as shown by a two-dot-dash line $L_{P3}$ in FIG. 12, the positive electrode precursor 10A is cut along the lateral direction S at a predetermined interval in the longitudinal direction L. As a result, a strip-shaped positive electrode plate 10 having a desired length is produced. A means for cutting the positive electrode precursor 10A along the two-dot-dash lines $L_{P2}$ and $L_{P3}$ is not particularly limited. For example, from the viewpoint of improving the manufacturing efficiency by shortening the cutting time, a cutting blade, a mold, a cutter or the like can be used for cutting the positive electrode precursor 10A along the two-dot-dash lines $L_{P2}$ and $L_{P3}$. Further, laser cutting can also be adopted in the same manner as the cutting along the dotted line $L_{P1}$.

Here, in the laser cutting of the protective layer application region shown by the dotted line $L_{P1}$, where a large impact is applied to the protective layer 16, the protective layer 16 may be blown off and may fall off or peel off. In such a case, since the positive electrode core 12 is exposed at the end side 10a of the positive electrode plate 10 after production, an internal short circuit is likely to occur. In order to prevent the protective layer 16 from falling off or peeling off, it is preferable to use a continuous wave laser (CW laser) for cutting the protective layer application region along the dotted line $L_{P1}$. Since such a continuous wave laser continuously generates a constant output, the peak output thereof is relatively small as compared with that of a pulsed laser described hereinbelow. Therefore, the application of a large impact such that the protective layer 16 is blown off to the protective layer 16 can be suppressed, and the protective layer 16 can be prevented from falling off or peeling off. Further, in the positive electrode plate 10 cut out by the continuous wave laser, the end portion of the positive electrode core 12 is once melted by the heat of the continuous wave laser and then solidified. As a result, as described hereinabove, the positive electrode thick portion 12b having a substantially spherical cross section is formed at the end portion of the positive electrode core 12.

The conditions of the continuous wave laser that cuts the protective layer application region are not particularly limited, and are preferably adjusted, as appropriate, according to the structure of the positive electrode precursor 10A (typically, the thickness and materials of the protective layer 16 and the positive electrode core 12). For example, the output of the continuous wave laser is preferably 500 W to 2000 W, more preferably 700 W to 1500 W, and can be set to, for example, 1000 W. As a result, the positive electrode precursor 10A can be easily cut while preventing the protective layer 16 from falling off or peeling off. Specifically, as the output of the continuous wave laser increases, cutting of the positive electrode precursor 10A tends to be facilitated. Meanwhile, as the output of the continuous wave laser decreases, the impact applied to the protective layer 16 decreases, so that the protective layer 16 can be more preferably prevented from falling off or peeling off.

The scanning speed of the continuous wave laser is preferably 2000 mm/sec to 10000 mm/sec, more preferably 4000 mm/sec to 8000 mm/sec, and can be set to, for example, 6000 mm/sec. As a result, the positive electrode precursor 10A can be easily cut while suppressing the burning of the protective layer 16. Specifically, as the scanning speed of the continuous wave laser is increased, the heat applied to the protective layer 16 becomes smaller, so that the protective layer 16 is less likely to be burnt out due to excessive heat. Meanwhile, as the scanning speed is slowed down, the laser easily penetrates to the opposite side of the positive electrode precursor 10A, so that cutting of the positive electrode precursor 10A tends to be facilitated. Meanwhile, the spot diameter of the continuous wave laser is preferably 10 μm to 60 μm, and more preferably 20 μm to 50 μm. As a result, the positive electrode plate can be easily cut out from the positive electrode precursor.

Negative Electrode Preparation Step S30

Next, in the manufacturing method as shown in FIG. 11, the negative electrode plate 20 is produced by carrying out the negative electrode preparation step S30 and the negative electrode cutting step S40. In the negative electrode preparation step S30, the negative electrode precursor 20A, which is the precursor of the negative electrode plate 20, is prepared. As shown in FIG. 13, the negative electrode precursor 20A includes a negative electrode core 22 which is a strip-shaped metal foil. The area of the negative electrode core 22 of the negative electrode precursor 20A is larger than the area of the negative electrode plate 20 described above. The negative electrode active material layer 24 is applied to the surface of the negative electrode core 22. Specifically, the negative electrode active material layer 24 is applied to the center of the negative electrode precursor 20A in the lateral direction S so as to extend along the longitudinal direction L. The negative electrode active material layer 24 is not applied to both side edges of the negative electrode precursor 20A (regions outside the negative electrode active material layer 24 in the lateral direction S), and a negative electrode exposed portion 22a where the negative electrode core 22 is exposed is formed. A means for preparing the negative electrode precursor 20A having the above configuration is not particularly limited, and various conventionally known methods can be adopted without particular limitation. For example, similarly to the production of the positive electrode precursor 10A, the negative electrode precursor 20A having the negative electrode active material layer 24 applied to the surface of the negative electrode core 22 can be produced by coating and drying a raw material paste.

Negative Electrode Cutting Step S40

In this step, the negative electrode plate 20 (see FIG. 9) is cut out from the negative electrode precursor 20A having the configuration shown in FIG. 13. In the negative electrode cutting step S40, the region to which the negative electrode active material layer 24 of the negative electrode precursor 20A has been applied (negative electrode active material layer application region) is cut with a laser. Specifically, as shown by a dotted line $L_{N1}$ in FIG. 13, the laser is scanned on the negative electrode active material layer 24 along an end side 24a of the negative electrode active material layer 24. As a result, the end side 24a of the negative electrode active material layer 24 where the thickness tends to be non-uniform can be cut off, and the negative electrode plate 20 having a uniform thickness of the negative electrode active material layer 24 can be produced. Further, the laser in this step scans outward in the lateral direction S at regular intervals, cuts a part of the negative electrode exposed portion 22a, and then scans inward in the lateral direction S in order to cut the negative electrode active material layer application region again (see dotted line $L_{N1}$). As a result, parts of the negative electrode exposed portion 22a are cut out in a convex shape, and a plurality of negative electrode tabs 22t protruding to the outside in the lateral direction S is formed. Further, in the present embodiment, as shown by a two-dot-dash line $L_{N2}$ in FIG. 13, the central portion of the negative electrode precursor 20A in the lateral direction S is cut along the longitudinal direction L. As a result, as shown in FIG. 7, the negative electrode plate 20 in which the negative electrode tabs 22t are formed only on one end side 20a in the lateral direction S can be produced. Further, in this step, as shown by a two-dot-dash line $L_{N3}$, the negative electrode precursor 20A is cut along the lateral direction S at a predetermined interval in the longitudinal direction L. As a result, the strip-shaped negative electrode plate 20 having a desired length is produced. Similar to the cutting of the positive electrode precursor 10A described above, laser cutting may not be used for cutting the negative electrode precursor 20A along the two-dot-dash line lines $L_{N2}$ and $L_{N3}$, and a mold, a cutter, or the like may be used.

Here, where the negative electrode active material layer application region is cut with a laser as shown by the dotted line $L_{N1}$, a part of the negative electrode core 22 melted by the heat of the laser may be mixed with the negative electrode active material layer 24. When the metal component derived from the negative electrode core 22 solidifies in the negative electrode active material layer 24, the adhesiveness of the negative electrode active material layer 24 is significantly lost, and there is a risk of the negative electrode active material layer easily falling off or peeling off from the negative electrode core 22 under a slight impact. Accordingly, it is preferable to use a pulsed laser as a laser for cutting out the negative electrode plate 20 from the negative electrode precursor 20A. Since such a pulsed laser can concentrate and apply a large amount of energy in a short time slot (high peak output), it is possible to perform cutting at a reduced amount of melting of the negative electrode core. As a result, it is possible to prevent a part of the molten negative electrode core 22 from being mixed with the negative electrode active material layer 24, and to adequately prevent the negative electrode active material layer 24 from falling off or peeling off.

Then, when the negative electrode exposed portion 22a of the negative electrode precursor 20A is cut by using such a pulsed laser, the first region 22t1 having an oxide film is formed along the end side 22ta of the negative electrode tab 22t cut out from the negative electrode exposed portion 22a. By adjusting the conditions of the pulsed laser so that the width w1 of the first region 22t1 is 0.01 mm or more and the thickness of the oxide film in the first region 22t1 is 40 nm or more, the negative electrode plate 20 in the above-described embodiment can be easily produced.

The conditions of the pulsed laser at this time are not limited to specific conditions and are preferably adjusted, as appropriate, according to the structure of the negative electrode precursor 20A (typically, the thickness and material of the negative electrode core 22). As an example, the peak output of the pulsed laser is preferably 4 kW to 10 kW, more preferably 5 kW to 8 kW, and can be set to, for example, 5 kW. The scanning speed of the pulsed laser is preferably 20 mm/sec to 5000 mm/sec, more preferably 150 mm/sec to 4000 mm/sec. The spot diameter of the pulsed laser is preferably 10 μm to 60 μm, and more preferably 20 μm to 50 μm. By adjusting, as appropriate, these conditions, the first region 22t1 having an oxide film having adequate thickness and width can be formed along the end side 22ta of the negative electrode tab 22t.

Electrode Body Production Step S50

Next, in the manufacturing method as shown in FIG. 11, the electrode body manufacturing step S50 of manufacturing the electrode body including the positive electrode plate 10, the negative electrode plate 20, and the separator 30 is carried out. As shown in FIG. 7, in this electrode body production step S50, a wound electrode body 40 in which a strip-shaped positive electrode plate 10 and a strip-shaped negative electrode plate 20 are wound via a strip-shaped separator 30 is produced. Specifically, a laminate is produced in which the separator 30, the negative electrode plate 20, the separator 30, and the positive electrode plate 10 are laminated in this order (see FIG. 7). Then, the laminated body is wound so that a plurality of positive electrode tabs 12t is laminated at the same position on one side edge in the lateral direction S and a plurality of negative electrode tabs 22t is laminated at the same position on the other side edge. As a result, the wound electrode body 40 such as shown in FIG. 7 is produced. In the wound electrode body 40, the first region 22t1 having an oxide film having thickness and width of certain values or more is formed along the end side 22ta of the negative electrode tab 22t of the negative electrode plate 20.

A secondary battery 100 having the configuration shown in FIGS. 1 to 10 can be manufactured by accommodating the wound electrode body 40 produced through the above steps together with an electrolytic solution inside a battery case 50 and connecting the wound electrode body 40 to electrode terminals (positive electrode terminal 60 and negative electrode terminal 65). As for the specific procedure for constructing the secondary battery 100 using the wound electrode body 40, a conventional well-known manufacturing method can be adopted without particular limitation, and the technique disclosed herein is not limited. Therefore, detailed description will be omitted.

As described above, in the manufacturing method described hereinabove, in the negative electrode cutting step S40, the negative electrode exposed portion 22a of the negative electrode precursor 20A is cut by using a pulsed laser adjusted to predetermined conditions. With this, the first region 22t1 having an oxide film having thickness and width of certain values or more can be formed along the end side 22ta of the negative electrode tab 22t. As a result, a metal piece that can be peeled off from the electrode tab can be insulated and inactivated in advance, so that an internal short circuit caused by the peeled metal piece can be suppressed. That is, according to the manufacturing method described herein, a highly safe secondary battery can be obtained.

Further, although it is not intended to limit the technique disclosed herein, when the secondary battery 100 is produced by the above-mentioned manufacturing method, the thickness of the negative electrode thick portion 22b of the negative electrode core 22 can be smaller than the thickness of the positive electrode thick portion 12b of the positive electrode core 12. In the negative electrode cutting step S40 in the above-mentioned manufacturing method, the negative electrode core 22 is vaporized by using a pulsed laser. Meanwhile, in the positive electrode cutting step S20, the positive electrode core 12 cut while being gradually melted by a continuous wave laser. Thus, since the negative electrode thick portion 22b of the negative electrode core 22 is formed of less metal than the positive electrode thick portion 12b of the positive electrode core 12, the thickness tends to be smaller than that of the positive electrode thick portion 12b.

Other Embodiments

One embodiment of the technique disclosed herein has been described above. It should be noted that the above-described embodiment illustrates an example to which the technique disclosed herein is applied, and does not limit the technique disclosed herein.

For example, in the above-described embodiment, a wound electrode body 40 is used as the electrode body. However, the electrode body may be any one including a positive electrode plate, a negative electrode plate, and a separator, and is not limited to the wound electrode body. Another example of such an electrode body is a laminated electrode body in which a plurality of positive electrode plates and negative electrode plates are sequentially laminated with a separator interposed therebetween. In order to produce a positive electrode plate to be used for this type of laminated electrode body, it is preferable to perform cutting along the lateral direction S as shown by a double-dot-dash line $L_{P3}$ in FIG. 12 for each positive electrode tab 12t.

Similarly, in order to produce a negative electrode plate for the laminated electrode body, cutting along the lateral direction S as shown by a double-dot-dash line $L_{N3}$ in FIG. 13 may be performed for each negative electrode tab 22t. Then, a laminate electrode body can be produced by laminating the electrode plates with a separator interposed therebetween so that the positive electrode tabs 12t of the positive electrode plates are laminated at the same position and the negative electrode tabs 22t of the negative electrode plates are laminated at the same position. Further, in the manufacturing process of the secondary battery having such a laminated electrode body, the negative electrode exposed portion 22a of the negative electrode precursor 20A may be also cut by a laser, so that the technique disclosed herein can be applied.

Further, in the above-described embodiment, the negative electrode active material layer 24 is applied to the end side 20a located between the negative electrode tabs 22t in the longitudinal direction L in order to prevent the metal pieces from peeling off from the portions other than the negative electrode tabs 22t. However, the configuration of the end side of the electrode plate does not limit the technique disclosed herein. For example, a region where the electrode core is exposed (exposed core region) may be formed so as to be adjacent to an end side located between a plurality of electrode tabs. An electrode plate having such an exposed core region can be produced, for example, by cutting only the negative electrode exposed portion 22a of the negative electrode precursor 20A shown in FIG. 13 to cut out the negative electrode plate. When manufacturing an electrode plate having an exposed core region, it is preferable to adjust the laser cutting conditions and the like so that the first region having an oxide film is also formed in the exposed core region. As a result, a metal piece peeling off from the exposed core region can be insulated and inactivated, so that an internal short circuit of the secondary battery can be more suitably prevented. However, the oxide film (first region) may be formed at least on the end side of the electrode tab, and the formation of the oxide film on the exposed core region does not limit the technique disclosed herein.

In addition, the above-described embodiment is aimed at a high-capacity secondary battery 100 in which three wound electrode bodies 40 are accommodated inside the battery case 50. However, the number of electrode bodies accommodated in one battery case is not particularly limited, and may be two or more (plural) or one. Further, the secondary battery 100 according to the above-described embodiment is a lithium ion secondary battery in which lithium ions are charge carriers. However, the secondary battery disclosed herein is not limited to the lithium ion secondary battery. Since the negative electrode exposed portion 22a of the negative electrode precursor 20A can be cut by a laser also in the manufacturing process of another secondary battery (for example, nickel-hydrogen battery or the like), the technique disclosed herein can be applied thereto.

Further, the secondary battery 100 according to the above-described embodiment is a non-aqueous electrolyte secondary battery using a non-aqueous electrolytic solution as an electrolyte. However, the techniques disclosed herein can also be applied to batteries other than non-aqueous electrolyte secondary batteries. Another example of the structure of a secondary battery is an all-solid-state battery. In the all-solid-state battery, a solid electrolyte layer, obtained by molding a solid electrolyte to have a sheet shape, is used as a separator interposed between a positive electrode plate and a negative electrode plate. In the all-solid-state battery, the separator and the electrolyte are integrated and contained inside the electrode body, so that leakage of the electrolytic solution and the like can be prevented. Since the negative electrode exposed portion 22a of the negative electrode precursor 20A can be cut by a laser also in the manufacturing process of this type of all-solid-state battery, the technique disclosed herein can be applied thereto.

Furthermore, the manufacturing method described above is not intended to limit the secondary battery disclosed herein. For example, even when the negative electrode plate 20 is cut out from the negative electrode precursor 20A without using a pulsed laser under predetermined conditions, the first region 22t1 having an oxide film having constant thickness and width can be formed along the end side 22ta on the negative electrode tab 22t. For example, when the negative electrode plate 20 is cut out by a laser other than the pulsed laser or a cutter, the end side 22ta of the negative electrode tab 22t of the negative electrode plate 20 may be subjected to thermal oxidation treatment. As a result, the first region 22t1 having an oxide film having sufficient thickness and width can be formed along the end side 22ta of the negative electrode tab 22t of the negative electrode plate 20. Considering that the first region 22t1 can be efficiently formed, it is preferable to cut the negative electrode exposed portion 22a using a pulsed laser under predetermined conditions and form an oxide film having predetermined thickness and width while forming the negative electrode tab 22t, as in the above-described manufacturing method.

Further, in the above-described embodiment, an electrode plate in which a first region having an oxide film with predetermined thickness and width is formed on the electrode tab is used for the negative electrode plate 20. However, the technique disclosed herein can be widely applied to various electrode plates, and the application is not limited to the negative electrode plate. For example, the positive electrode core used for the positive electrode plate is preferably configured of aluminum, an aluminum alloy, or the like. A metal piece (aluminum piece) that is peeled off from the positive electrode core can be adequately insulated and inactivated by forming a first region having an oxide film (aluminum oxide film) having predetermined thickness and width on the positive electrode tab of this type of aluminum positive electrode core. The material of the electrode core in the electrode plate disclosed herein is not limited to a copper-based material and an aluminum-based material described above, and any metal material having a predetermined conductivity can be used without particular limitation.

Test Example

Hereinafter, a test example relating to the present disclosure will be described. The contents of the test example described hereinbelow are not intended to limit the present disclosure.

1. Preparation of Each Sample
(1) Sample 1

In Sample 1, first, a negative electrode precursor in which a negative electrode active material layer having a thickness of 80 μm was applied to both sides of a negative electrode core (copper foil) having a thickness of 8 μm was prepared. The negative electrode active material layer of the negative electrode precursor included a negative electrode active material, a thickener, and a binder in a ratio of 98.3:0.7:1.0. Graphite was used as the negative electrode active material, carboxymethyl cellulose (CMC) was used as the thickener, and styrene butadiene rubber (SBR) was used as the binder. Further, a negative electrode active material layer was not applied and a negative electrode exposed portion in which the negative electrode core was exposed was formed on both side edges of the negative electrode precursor.

Next, the above-mentioned negative electrode precursor was laser-cut so that a negative electrode plate having negative electrode tabs was formed. Specifically, a negative electrode plate having a plurality of negative electrode tabs was produced by cutting out a part of the negative electrode exposed portion in a convex shape at regular intervals while laser cutting the negative electrode active material layer application region of the negative electrode precursor (see dotted line $L_{N1}$ in FIG. 13). Here, in Sample 1, a pulsed laser was used for the above-mentioned laser cutting. The peak output of the pulsed laser at this time was set to 3 kW, and the scanning speed was set to 333 mm/sec. The spot diameter of the pulsed laser was set to 30 μm.
(2) Sample 2

In Sample 2, a negative electrode plate was produced under the same conditions as in Sample 1, except that the peak output of the pulsed laser was changed to 4 kW.
(3) Sample 3

In Sample 3, a negative electrode plate was produced under the same conditions as in Sample 1, except that the peak output of the pulsed laser was changed to 5 kW.
(4) Sample 4

In sample 4, a negative electrode plate was prepared under the same conditions as in sample 1, except that a continuous wave laser (CW laser) was used for laser cutting. The average output of the continuously oscillating laser was set to 1 kW. The scanning speed was set to 6000 mm/sec, and the spot diameter was set to 30 μm.

2. Evaluation Test

Figure 14:
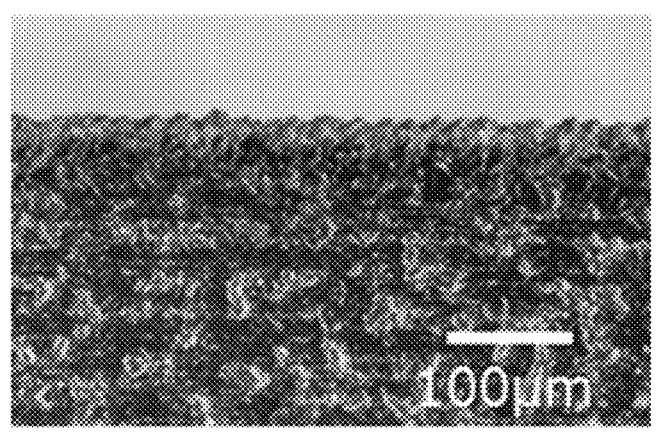
FIG. 14 is a plan micrograph of the end side of a negative electrode tab of Sample 1.
Figure 15:
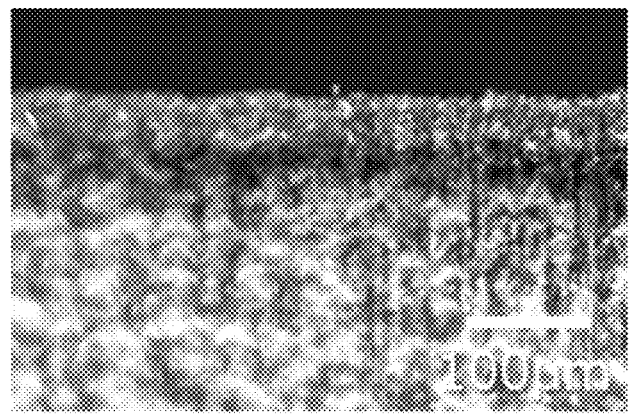
FIG. 15 is a plan micrograph of the end side of a negative electrode tab of Sample 2.
Figure 16:
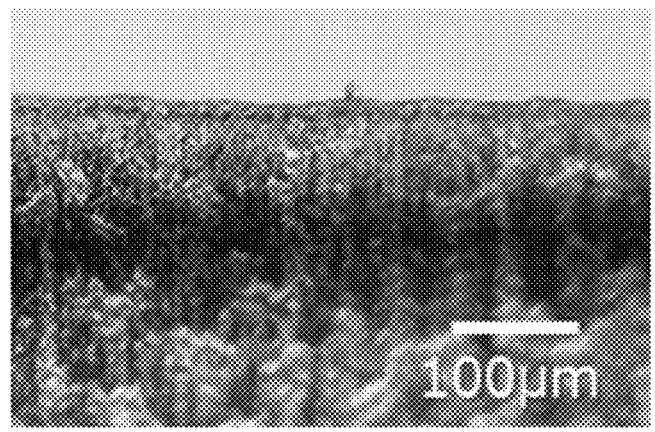
FIG. 16 is a plan micrograph of the end side of a negative electrode tab of Sample 3.
Figure 17:
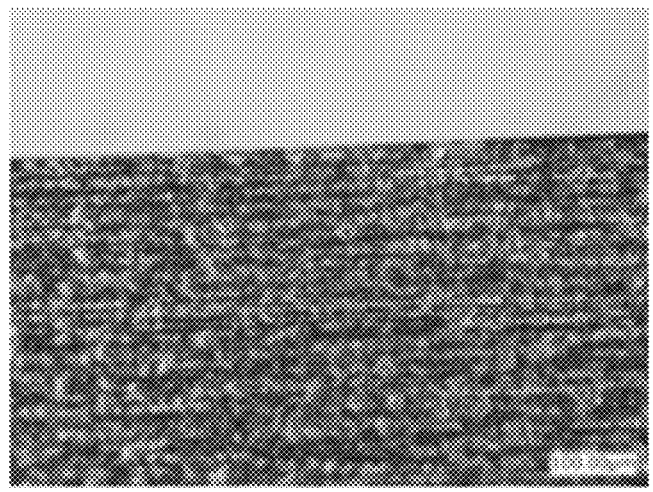
FIG. 17 is a plan micrograph of the end side of a negative electrode tab of Sample 4.

In this test, the surface of the laser cutting site (end side of the negative electrode tab) in each of the above samples was observed using a microscope. The observation results are shown in FIGS. 14 to 16. FIG. 14 is a plan micrograph of the end side of the negative electrode tab of Sample 1. FIG. 15 is a plan micrograph of the end side of the negative electrode tab of Sample 2. FIG. 16 is a plan micrograph of the end side of the negative electrode tab of Sample 3. FIG. 17 is a plan micrograph of the end side of the negative electrode tab of Sample 4.

In this test, the thickness of the oxide film at the laser cutting site was measured based on the micrograph taken. When the thickness of the oxide film was 40 nm or more, it was considered that the first region was formed on the end side of the negative electrode tab, and the width of the first region was measured. The results of each measurement are shown in Table 2 below. The thickness of the oxide film in this test was determined based on the above-mentioned "Definition of the relationship between the surface color of an oxide film and the thickness of the oxide film" by Miley & Evans.

TABLE 2

|  | Sample 1 | Sample 2 | Sample 3 | Sample 4 |
| --- | --- | --- | --- | --- |
| Peak output (kW) | 3 | 4 | 5 | 1 |
| Scanning speed (mm/sec) | 333 | 333 | 333 | 600 |
| Thickness of copper oxide film (nm) | less than 40 | 40 to 50 | 80 | 0 |
| Width of first region (mm) | 0 | 0.051 | 0.095 | 0 |

First, as shown in FIGS. 14 to 16, in Samples 1 to 3, a region in which the copper negative electrode core was discolored was formed along the end side of the negative electrode tab (upper end side in the figure), which is the laser cutting site. It is understood that an oxide film was formed in the discolored region. Meanwhile, as shown in FIG. 17, in Sample 4 for which the CW laser was used, absolutely no region (oxide film) in which the negative electrode core was discolored was confirmed. In the micrograph (Sample 1) shown in FIG. 14, the end side of the negative electrode tab was discolored to dark brown. Therefore, according to the definition of Miley & Evans described above, it is understood that an oxide film having a thickness of less than 40 nm (about 37 nm) was formed on the end side of the negative electrode tab. However, it is understood that when a metal piece is peeled off from the negative electrode tab, the oxide film formed in Sample 1 is insufficient to adequately insulate the metal piece.

Meanwhile, in the SEM micrograph (Sample 2) shown in FIG. 15, the end side of the negative electrode tab was discolored from purple to blue. From this, it is understood that a first region having an oxide film having a thickness of about 40 nm to 50 nm was formed on the end side of the negative electrode tab of Sample 2. Further, in the micrograph (Sample 3) shown in FIG. 16, the end side of the negative electrode tab was discolored to silver. From this, it is understood that a first region having an oxide film having a thickness of about 80 nm was formed on the end side of the negative electrode tab of Sample 3. The width of the first region of these Samples 2 and 3 was 0.01 mm or more. It is understood that the oxide films of these Samples 2 and 3 are thick enough to adequately insulate a metal piece peeled off from the negative electrode tab. From the above points, it is expected that when the first region having an oxide film having a thickness of 40 nm or more is formed along the end side of the electrode tab and the width of the first region is 0.01 mm or more, a metal piece peeled off from the negative electrode tab can be adequately insulated and the internal short circuit of the secondary battery can be suppressed.

Further, in Samples 2 and 3, a region (second region) in which color changed continuously from purple to dark brown toward the inside in the width direction (lower side in FIGS. 15 and 16) was formed adjacent to the first region. In such a second region, it is understood that the thickness of the oxide film gradually decreases in the range of 40 nm to 0 nm. Since such a second region in which the thickness of the oxide film gradually decreases is adjacent to the first region, there is no clear boundary between the first region and the non-oxidized region. As a result, it is understood that the oxide is more fixedly attached to the non-oxidized region.

The present disclosure has been described in detail above, but the above description is merely an example. That is, the technique disclosed herein is inclusive of various changes and modifications of the above-mentioned specific examples.

What is claimed is:

1. An electrode plate for use in a secondary battery, the electrode plate comprising:
   an electrode core including a conductive metal material;
   an electrode active material layer that is applied to a surface of the electrode core and includes an electrode active material; and
   an electrode tab which protrudes to the outside from one end side in a width direction and in which the electrode active material layer is not applied and the electrode core is exposed, wherein
   a first region of the electrode tab having an oxide film of the metal material with a thickness of 40 nm to 200 nm is formed in a region with a length that falls within a range from 0.01 mm to 0.2 mm, and that extends from an outer end side of the electrode tab toward the inside in the width direction, and the first region extends along the outer end side of the electrode tab, and
   a portion of the electrode tab where the first region having the oxide film is not formed is provided between the first region and the electrode active material layer.

2. The electrode plate according to claim 1, wherein a second region in which a thickness of the oxide film of the metal material gradually decreases toward the inside in the width direction is formed so as to be adjacent to the inside of the first region in the width direction.

3. The electrode plate according to claim 1, wherein the electrode core includes copper or a copper alloy as the metal material.

4. The electrode plate according to claim 1, that is to be used for a negative electrode of a secondary battery.

5. The electrode plate according to claim 4, wherein
   a plurality of the electrode tabs is formed on one end side in the width direction of the electrode plate at a predetermined interval in a longitudinal direction of the electrode plate, and
   the electrode active material layer is adjacent to the end side located between the plurality of electrode tabs.

6. The electrode plate according to claim 5, wherein a thick portion having a thickness larger than that of the electrode core in a central region in the width direction is provided at an end of the electrode core on an end side adjacent to the electrode active material layer.

7. The electrode plate according to claim 6, wherein a coating layer including a carbon material or a compound including a carbon element is adhered to a surface of the thick portion.

8. The electrode plate according to claim 6, wherein a ratio of a thickness of the coating layer of the thick portion to a thickness of the electrode active material layer is 0.01 to 0.2.

9. The electrode plate according to claim 6, wherein the thick portion of the electrode core has a claw shape including a cap portion protruding on both sides or one side in a thickness direction, and a recess formed between the cap portion and the electrode core.

10. The electrode plate according to claim 1, wherein
    a plurality of the electrode tabs is formed on one end side in the width direction of the electrode plate at a predetermined interval in a longitudinal direction of the electrode plate,
    an exposed core region where the electrode core is exposed is adjacent to an end side located between the plurality of electrode tabs, the first region is formed on an outer end side of the exposed core region, and the first region extends along a longitudinal direction of the exposed core region.

11. A secondary battery comprising an electrode body including a positive electrode plate, a negative electrode plate, and a separator, wherein
    at least one of the positive electrode plate and the negative electrode plate is an electrode plate set forth in claim 1.

* * * * *